US012715050B2

(12) United States Patent
Watford et al.

(10) Patent No.: US 12,715,050 B2
(45) Date of Patent: Aug. 25, 2026

(54) BACKSET ADJUSTER FOR A DOOR LOCKSET JIG

(71) Applicant: Apex Brands, Inc., Apex, NC (US)

(72) Inventors: Jeremy Watford, Irmo, SC (US); Maxwell Daniel Stacey, Lexington, SC (US); Jeremy Hickman, Columbia, SC (US)

(73) Assignee: Apex Brands, Inc., Apex, NC (US)

( * ) Notice: Subject to any disclaimer, the term of this patent is extended or adjusted under 35 U.S.C. 154(b) by 452 days.

(21) Appl. No.: 18/278,083

(22) PCT Filed: Feb. 25, 2022

(86) PCT No.: PCT/US2022/017800
§ 371 (c)(1),
(2) Date: Aug. 21, 2023

(87) PCT Pub. No.: WO2022/182928
PCT Pub. Date: Sep. 1, 2022

(65) Prior Publication Data

US 2024/0123520 A1 Apr. 18, 2024

Related U.S. Application Data

(63) Continuation of application No. 17/677,038, filed on Feb. 22, 2022, now Pat. No. 11,911,832, and a (Continued)

(51) Int. Cl.
*B23B 47/28* (2006.01)
*E05B 17/06* (2006.01)

(52) U.S. Cl.
CPC ........ *B23B 47/287* (2013.01); *B23B 2247/06* (2013.01); *E05B 17/06* (2013.01)

(58) Field of Classification Search
CPC ... B23B 47/287; B23B 2247/06; E05B 17/06; B25H 1/0021
See application file for complete search history.

(56) References Cited

U.S. PATENT DOCUMENTS 2,679,771 A 6/1954 Schlage
4,248,554 A 2/1981 Boucher et al.
(Continued)

FOREIGN PATENT DOCUMENTS

EP 0498510 A1 8/1992
GB 2546102 A 7/2017
WO 0220204 A1 3/2002

OTHER PUBLICATIONS

International Search Report and Written Opinion of International Application No. PCT/US2022/017800 mailed May 20, 2022, all pages cited in its entirety.

*Primary Examiner* — Moshe Wilensky
(74) *Attorney, Agent, or Firm* — Burr & Forman

(57) ABSTRACT

A cutting guide apparatus for guiding placement of bore holes in a door may include an engagement interface and a backset assembly. The engagement interface is configured to retain the apparatus proximate to an edge of a door and center an edge bore guide between an inside face and an outside face of the door. The engagement interface includes a first arm and a second arm that are each operably coupled to a common pivot axis. The backset assembly is operably coupled to the engagement interface to enable an amount of backset from the edge of the door to a center of a handle hole guide to be adjusted. The backset assembly includes a first mounting bracket operably coupled to a first portion of the first arm and a first portion of the second arm, and a second mounting bracket operably coupled to a second portion of the first arm.

11 Claims, 17 Drawing Sheets

Related U.S. Application Data continuation of application No. 17/677,025, filed on Feb. 22, 2022, now Pat. No. 11,980,950.

(60) Provisional application No. 63/216,306, filed on Jun. 29, 2021, provisional application No. 63/154,084, filed on Feb. 26, 2021, provisional application No. 63/154,086, filed on Feb. 26, 2021.

(56) References Cited

U.S. PATENT DOCUMENTS

| | | | |
|---|---|---|---|
| 4,813,826 | A | 3/1989 | Riedel |
| 5,222,845 | A | 6/1993 | Goldstein et al. |
| 6,398,465 | B1 | 6/2002 | Monge |
| D516,401 | S | 3/2006 | Snider et al. |
| 7,356,902 | B2 | 4/2008 | Snider et al. |
| 9,850,670 | B2 | 12/2017 | Ward |
| 10,835,966 | B1 | 11/2020 | Qi |
| 2007/0041800 | A1 | 2/2007 | Santos |
| 2007/0110528 | A1 | 5/2007 | Chao |
| 2009/0279968 | A1 | 11/2009 | Kiezel |
| 2012/0017452 | A1 | 1/2012 | Lam et al. |
| 2016/0325361 | A1 | 11/2016 | Trettin et al. |
| 2018/0112418 | A1 | 4/2018 | Ward |
| 2020/0141153 | A1 | 5/2020 | Sawa et al. |

FIG. 2A.
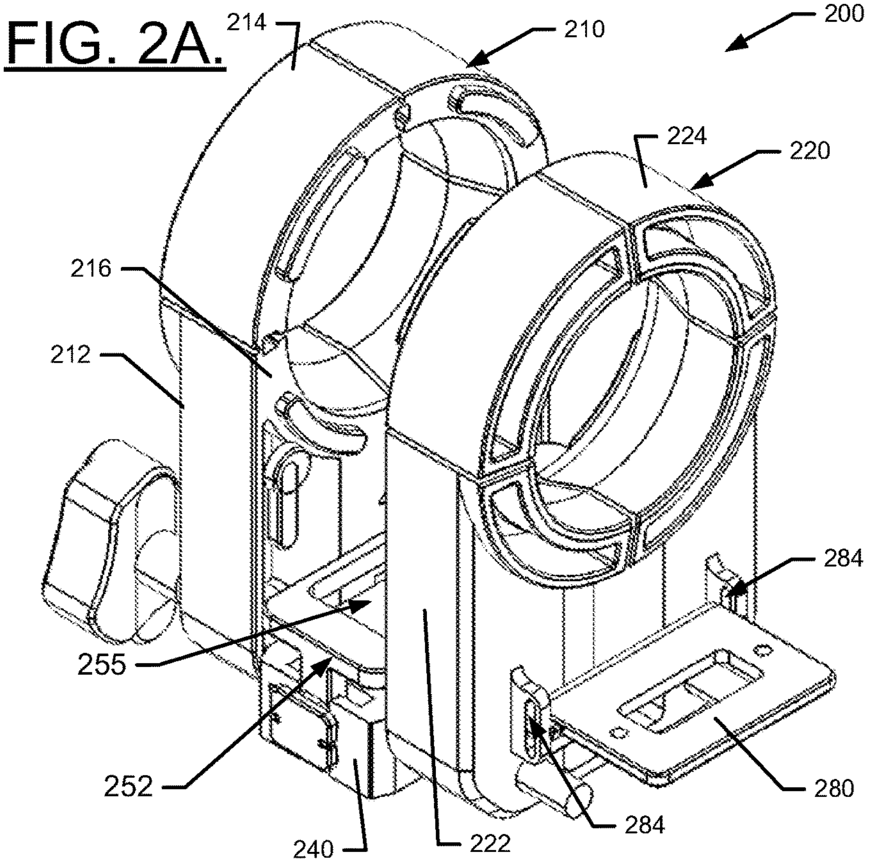
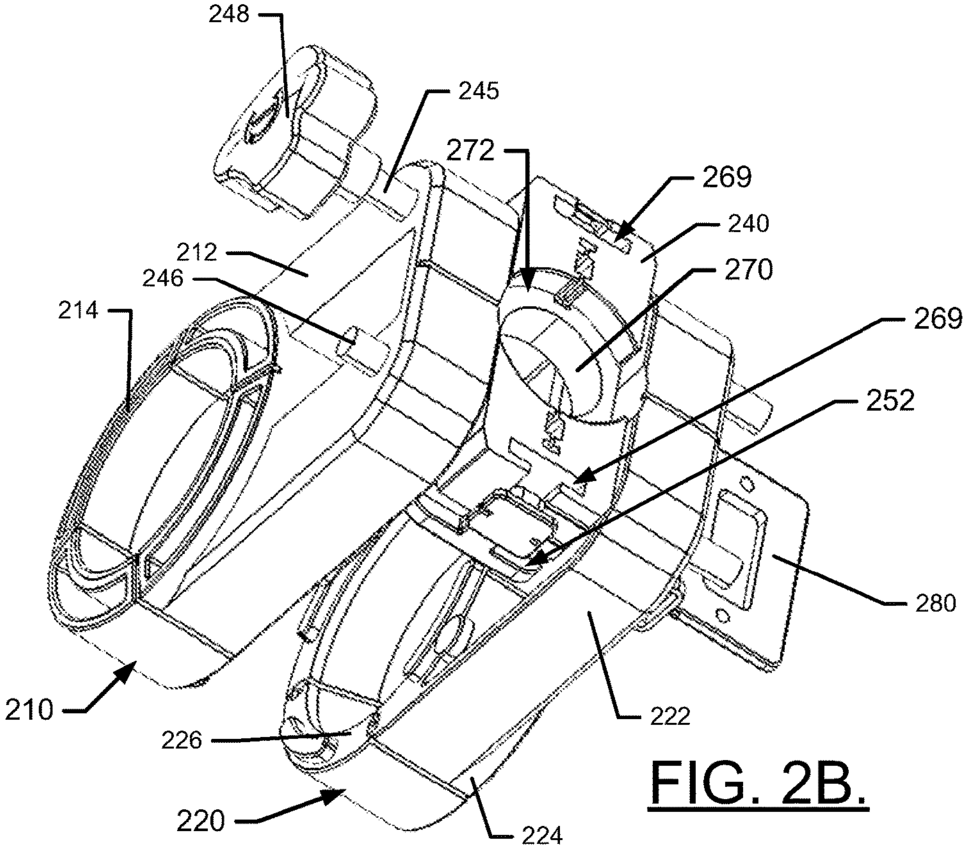
FIG. 2B.
214
210
200
224
220
216
212
284
255
252
280
284
240
222
248
245
272
269
240
212
246
270
214
269
252
280
210
222
226
220
224

FIG. 8A.
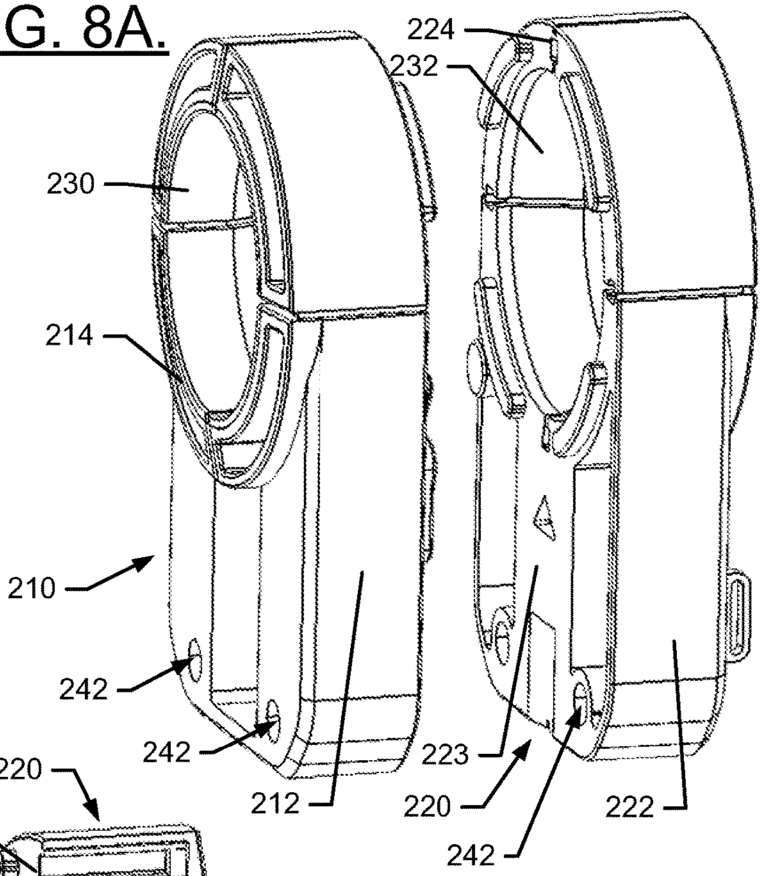
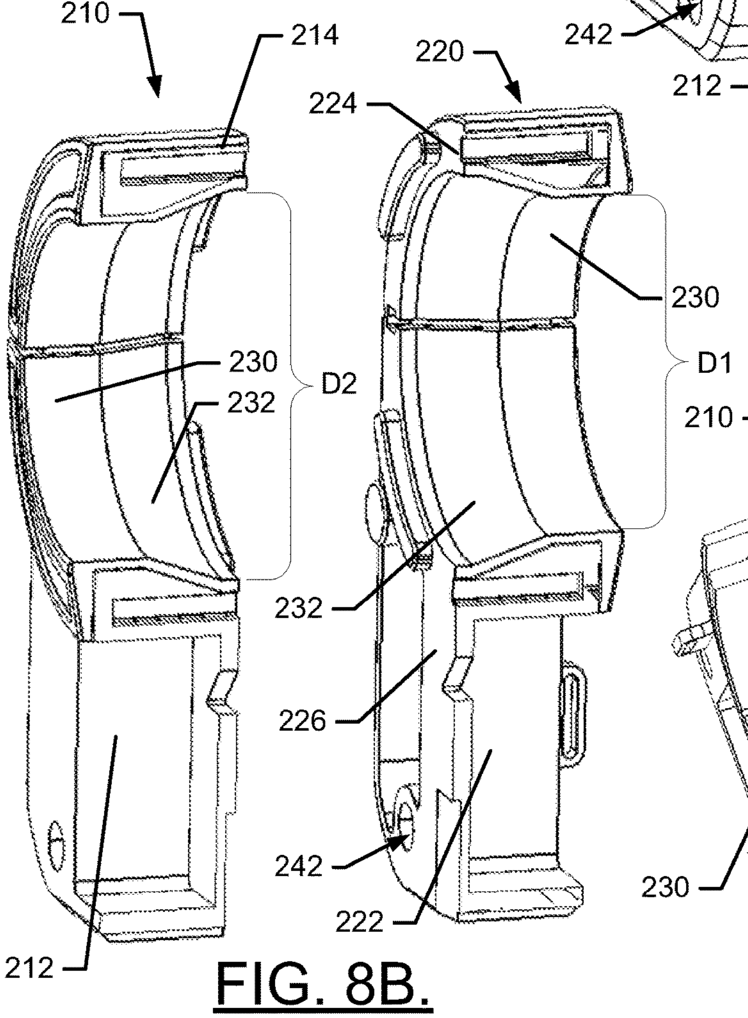
FIG. 8B.
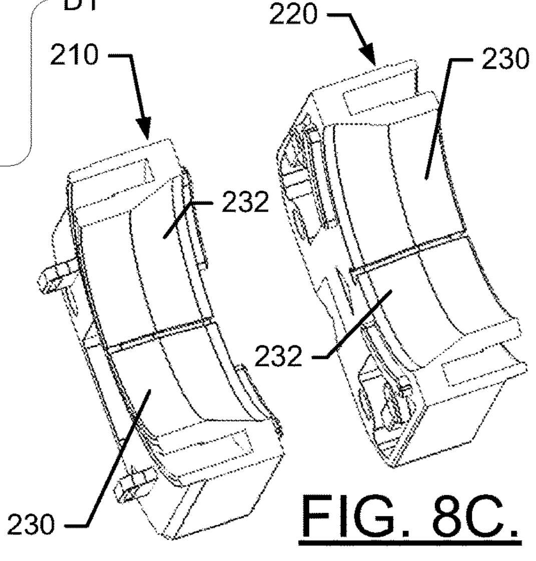
FIG. 8C.
224
232
230
214
210
242
242
212
223
220
242
222
210
214
220
224
230
230
D2
D1
232
232
226
242
222
212
220
210
230
232
232
230

FIG. 15A.
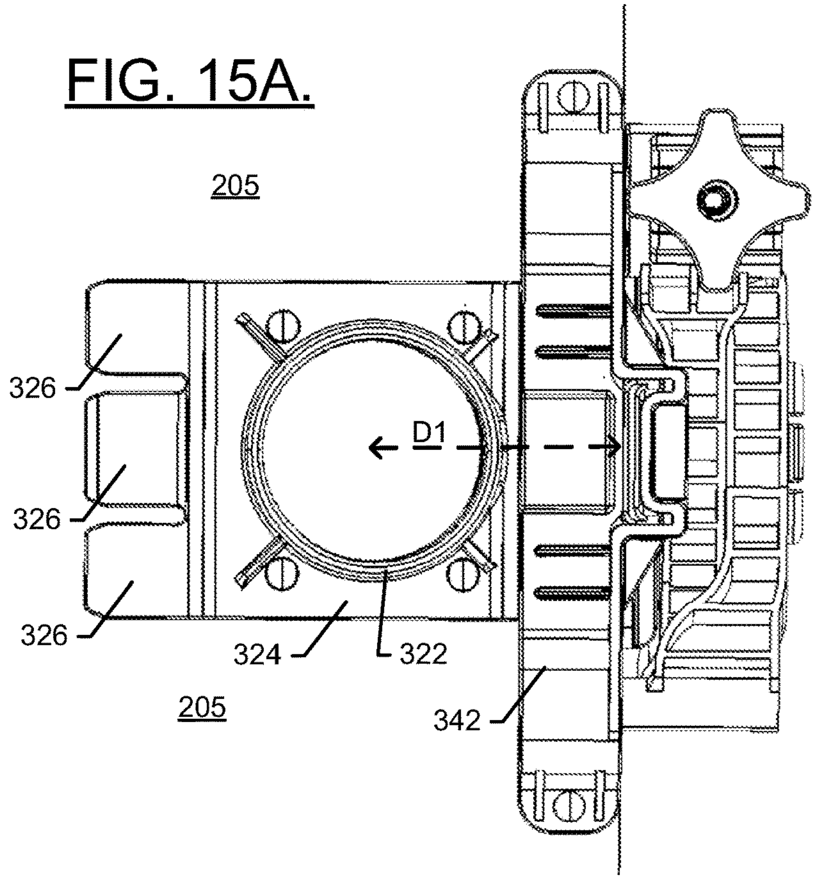
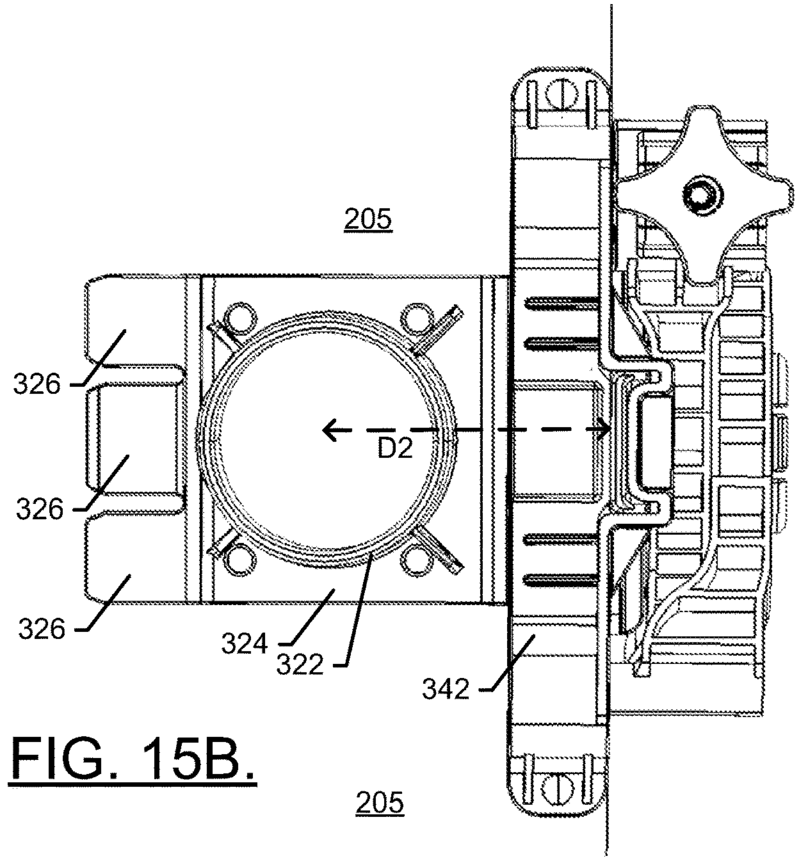
FIG. 15B.

BACKSET ADJUSTER FOR A DOOR LOCKSET JIG

TECHNICAL FIELD

Example embodiments generally relate to carpentry devices, and more particularly relate to a lockset jig for a door.

BACKGROUND

Door handle assemblies, that include door handles and/or locksets can vary widely in their outward appearances, and even to some degree in functional capability. However, the way the door handle assemblies interface with the door itself is fairly standard. In this regard, a bore hole is typically provided through the door to define a handle hole that passes from the inside to the outside surface of the door. The handle hole is located proximate to the opposite side of the door from the hinge assembly, and is typically at about waist height for an average person. Meanwhile, another bore hole (e.g., a "cross bore" or "edge bore") is provided perpendicular to the handle hole to receive the bolt or latch of the door handle assembly.

The edge bore must intersect with the handle hole, which is normally 2 and ⅛ inches in diameter. To ensure that this intersection occurs, and that the handles can properly and functionally connect to the bolt/latch, the handle hole must be spaced properly from the edge of the door. This spacing is referred to as "backset" and normally is again standard at one of either 2 and ⅜ inches or 2 and ¾ inches from the edge of the door. In order to provide this proper spacing in a consistent fashion, a jig may be used. The jig is typically attached to the edge of the door, and then provides for the specific locations at which a hole saw may be used to cut the handle hole, and also cut the bolt/latch hole with two correspondingly different sized hole saws.

In many cases, different jigs may be required to accommodate the different backset options of 2 and ⅜ inches or 2 and ¾ inches. Moreover, the hole saws can often damage the jigs at the edges of the bore hole when the hole saw cuts through the door. Thus, there remains a desire to improve current jig designs to eliminate these and other problems.

BRIEF SUMMARY OF SOME EXAMPLES

Some example embodiments may enable the provision of a cutting guide apparatus for guiding placement of bore holes in a door. The apparatus may include an engagement interface and a backset assembly. The engagement interface may be configured to retain the apparatus proximate to an edge of a door and center an edge bore guide between an inside face and an outside face of the door. The engagement interface includes a first arm and a second arm that are each operably coupled to a common pivot axis. The backset assembly is operably coupled to the engagement interface to enable an amount of backset from the edge of the door to a center of a handle hole guide to be adjusted. The backset assembly includes a first mounting bracket operably coupled to a first portion of the first arm and a first portion of the second arm. The first mounting bracket may be disposed along one of the inside face or the outside face. The backset assembly may include a second mounting bracket operably coupled to a second portion of the first arm, the second mounting bracket being disposed along the other of the outside face or the inside face.

In another example embodiment, a backset assembly for a cutting guide apparatus configured to guide placement of bore holes in a door may be provided. The backset assembly may include a first mounting bracket operably coupled to an engagement interface, a second mounting bracket operably coupled to the engagement interface, and a handle hole guide. The engagement interface includes a first arm and a second arm that are each operably coupled to a common pivot axis. The first mounting bracket may be disposed along one of an inside face or an outside face of the door. The second mounting bracket may be disposed along the other of the outside face or the inside face of the door. The handle hole guide may be configured to interchangeably attach to one of the first mounting bracket or the second mounting bracket via a first set of engagement structures or a second set of engagement structures. Attaching the handle hole guide to the first mounting bracket or the second mounting bracket via the first set of engagement structures may dispose a center of a handle hole collar a first distance from an edge of the door. Attaching the handle hole guide to the first mounting bracket or the second mounting bracket via the second set of engagement structures may dispose the center of a handle hole collar a second distance from the edge of the door, the second distance being larger than the first distance.

In another example embodiment, an engagement interface for a cutting guide apparatus for guiding placement of bore holes in a door may be provided. The engagement interface may include a first arm having a first end operably coupled to a first mounting bracket and a second end operably coupled to a second mounting bracket, and a second arm having a first end operably coupled to the second mounting bracket. The first and second arms may each be operably coupled to a common pivot axis and are adjustable about the common pivot axis to define a range of different distances between the first and second mounting brackets. The engagement interface may be configured to retain the cutting guide apparatus proximate to an edge of the door and center an edge bore guide between an inside face and an outside face of the door over an entirety of the range of different distances between the first and second mounting brackets.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 1 illustrates a block diagram of a cutting guide apparatus for guiding placement of bore holes in a door in accordance with an example embodiment;

FIG. 2, which is defined by FIGS. 2A and 2B, illustrates perspective views of one example implementation of the cutting guide apparatus of FIG. 1 in accordance with an example embodiment;

FIG. 8A is a perspective view of the first and second legs of the cutting guide apparatus in isolation according to an example embodiment;

FIG. 8B shows the first and second legs of FIG. 8A in cross section bisecting the first and second legs laterally according to an example embodiment;

FIG. 8C shows the first and second legs of FIG. 8A in cross section bisecting the first and second legs longitudinally of each of the first and second legs according to an example embodiment;

FIGS. 15A and 15B show different backsets achieved via the engagement of the handle hole guide and the backset assembly in accordance with an example embodiment;

DETAILED DESCRIPTION

Figure 1:
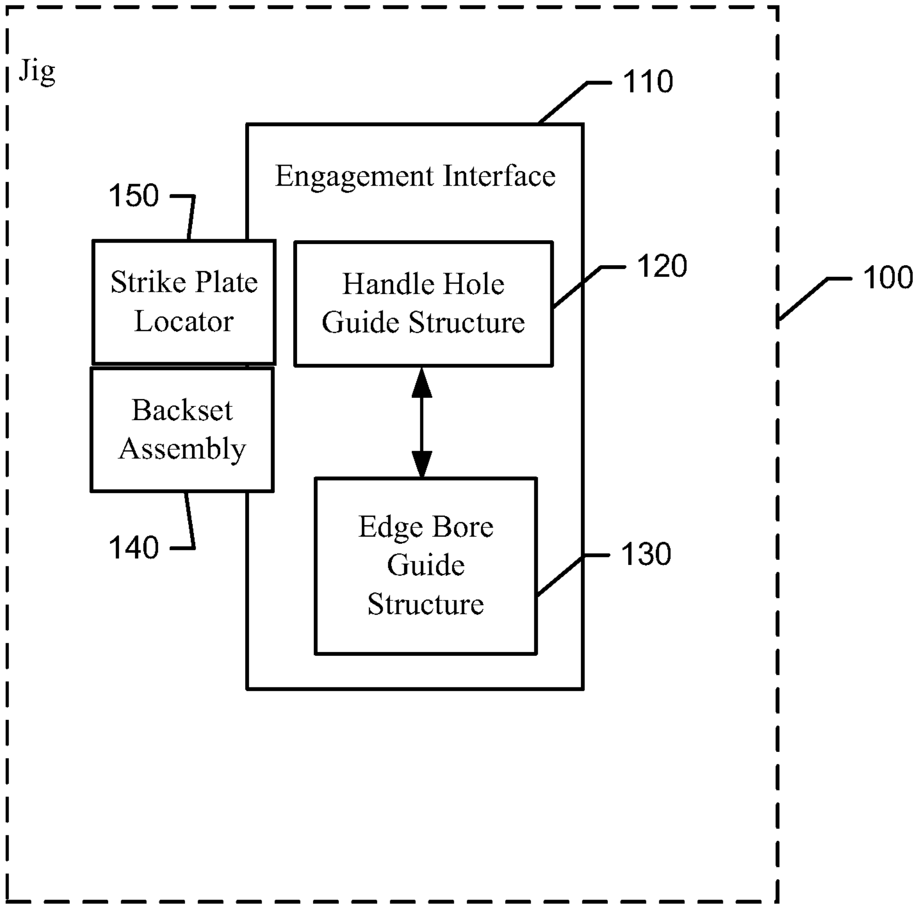

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may relate to the provision of a handle assembly installation jig (or simply, a "jig") that may have an improved configuration that prevents damage to the jig by routine usage, and that also has improved structures for interfacing with doors of any width, while enabling different selectable backsets to be employed. The jig is an example of a cutting guide apparatus that guides operation of a cutting tool (e.g., a hole saw) for the formation of an edge bore and a handle bore in a door.

FIG. 1 illustrates a block diagram of a cutting guide apparatus in the form of a jig 100 of an example embodiment. The jig 100 includes an engagement interface 110 that enables the jig 100 to be temporarily attached to the edge of a door. The engagement interface 110 of an example embodiment may be adjustable to enable the jig 100 to be used with doors that have different thicknesses (defined between the inside and outside faces of the door). The jig 100 also includes a handle hole guide structure 120 and an edge bore guide structure 130. In some cases, the handle hole guide structure 120 and the edge bore guide structure 130 may be operably coupled to each other, and may also be portions of the engagement interface 110. As will be discussed in greater detail below, the handle hole guide structure 120 may include structural improvements that prevent damaging the jig 100 during routine usage with a hole saw to cut the handle hole. Meanwhile, the edge bore guide structure 130 may also include structural improvements that enable the edge bore to be cut even with hole saws that have an arbor size that is larger than a diameter of the edge bore itself.

The jig 100 may also include a backset assembly 140 that enables different backsets (e.g., 2 and ⅜ inches or 2 and ¾ inches) to be supportable with only minor operator action. The backset assembly 140 of some embodiments may be operably coupled to the engagement interface 110. Thus, for example, the backset assembly 140 may be operably coupled to the edge bore guide structure 130. In an example embodiment, the jig 100 may also include a strike plate locator 150. The strike plate locator 150 may be operably coupled to the engagement interface 110 and/or the backset assembly 140 in some cases. Some, any or all of these improvements may be included in the jig 100. Moreover, it will be appreciated that different specific structures can be used to implement some of these improvements. Accordingly, although specific structures will be shown to illustrate some example structures that may be used to implement example embodiments, those specific structures should not be viewed as being limiting.

Figure 3:
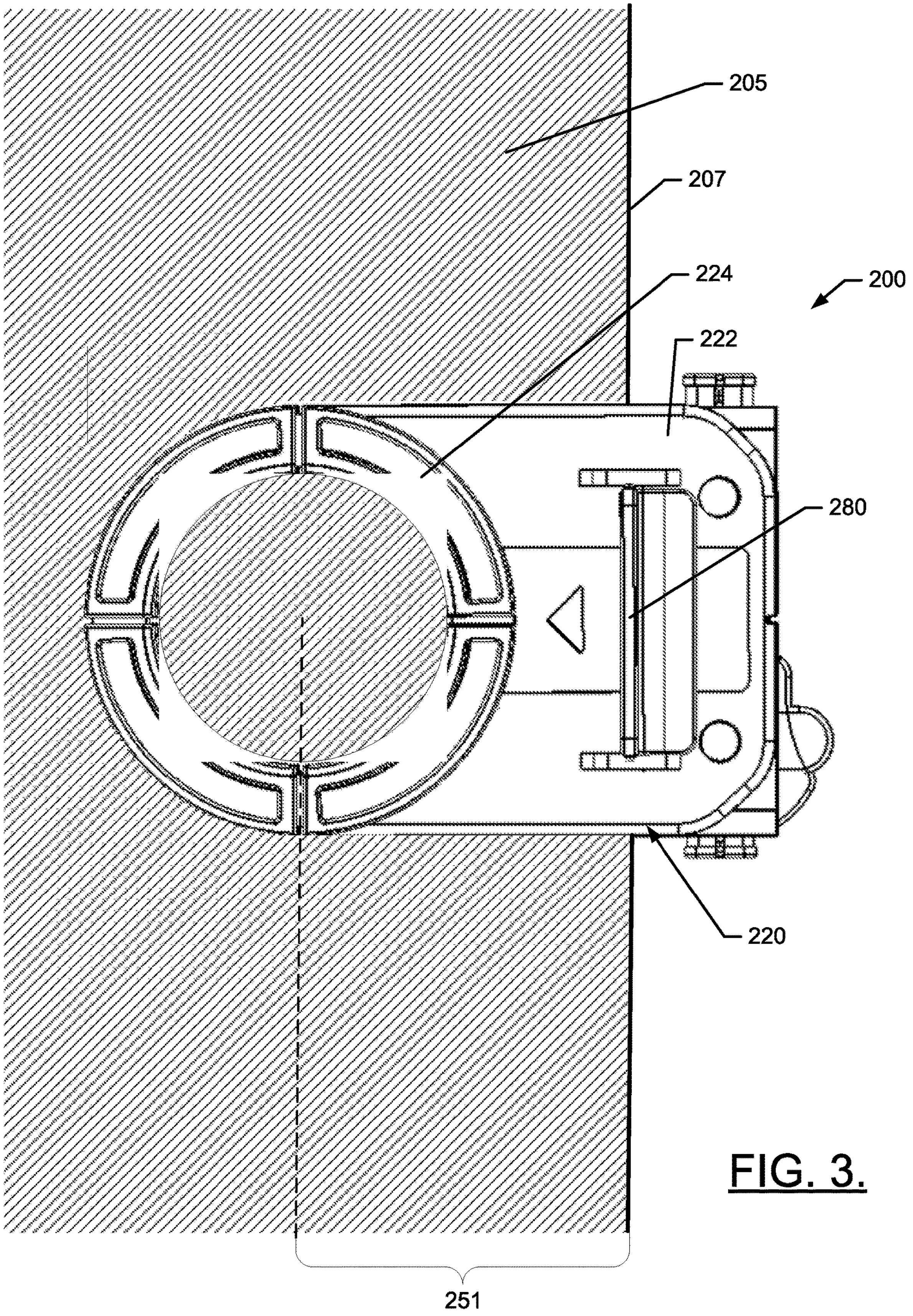
FIG. 3 is a side view of the cutting guide apparatus disposed on a door in accordance with an example embodiment.
Figure 4:
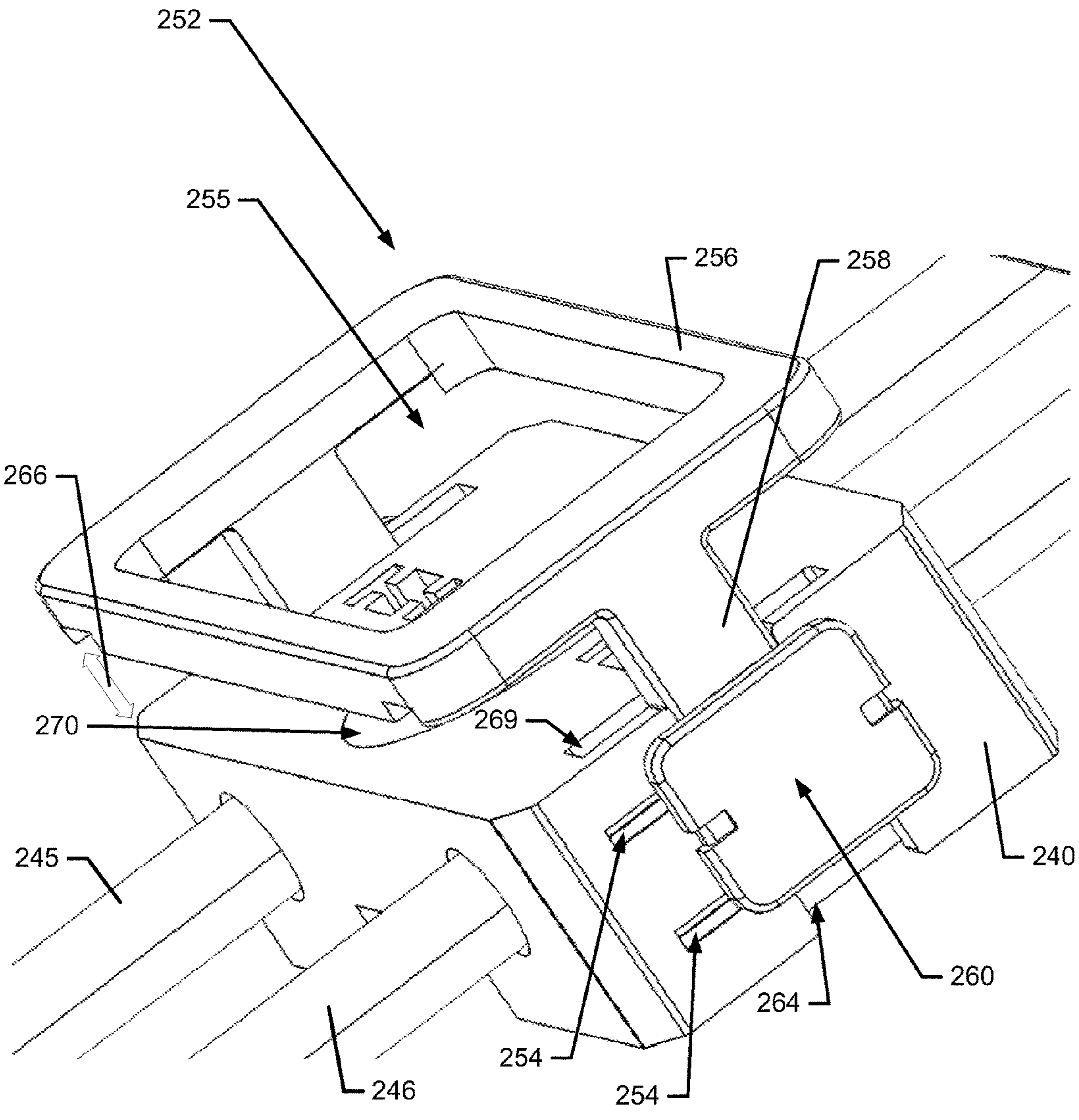
FIG. 4 is a perspective view of a backset assembly in accordance with an example embodiment.
Figure 6:
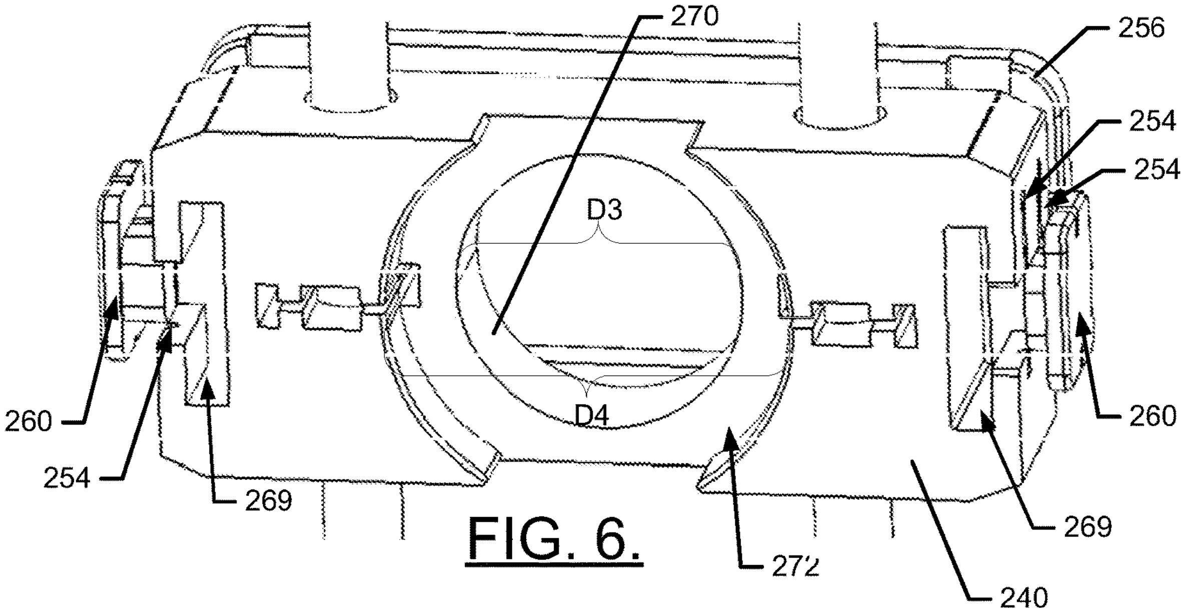
FIG. 6 is a perspective view of a spacing element according to an example embodiment.
Figure 5:
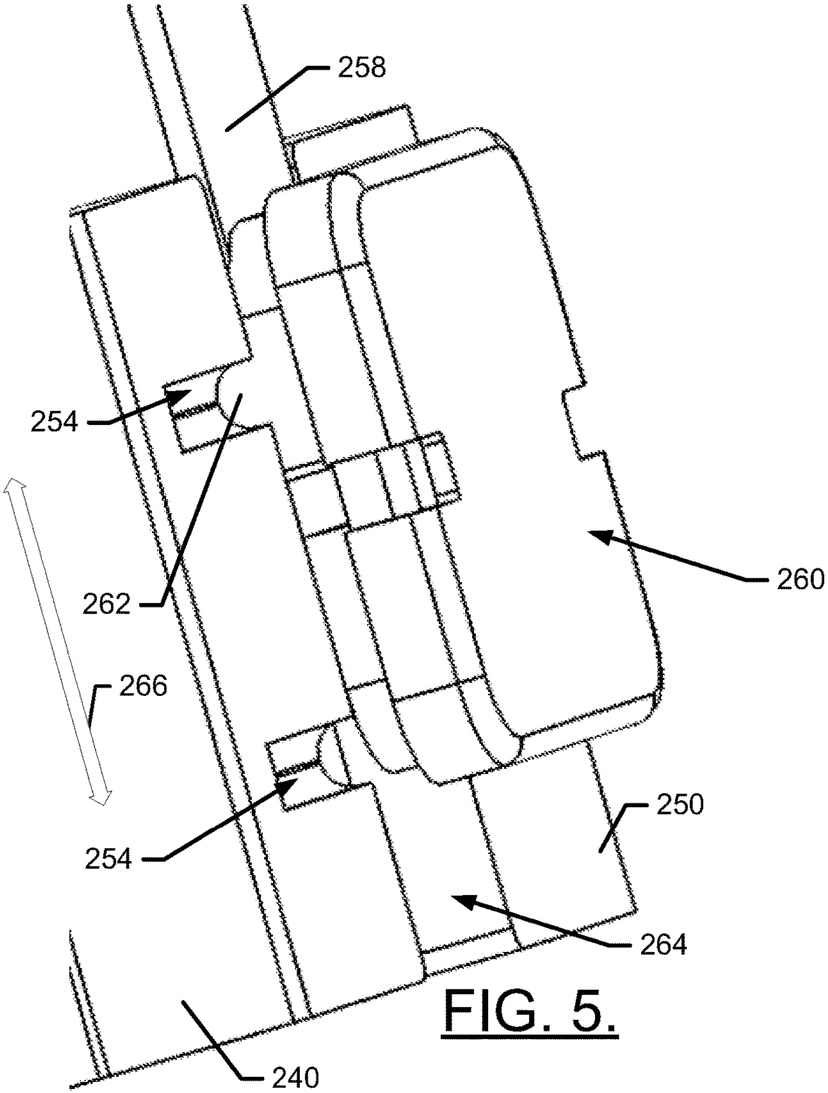
FIG. 5 is a perspective view of an engagement tab in accordance with an example embodiment.
Figure 7:
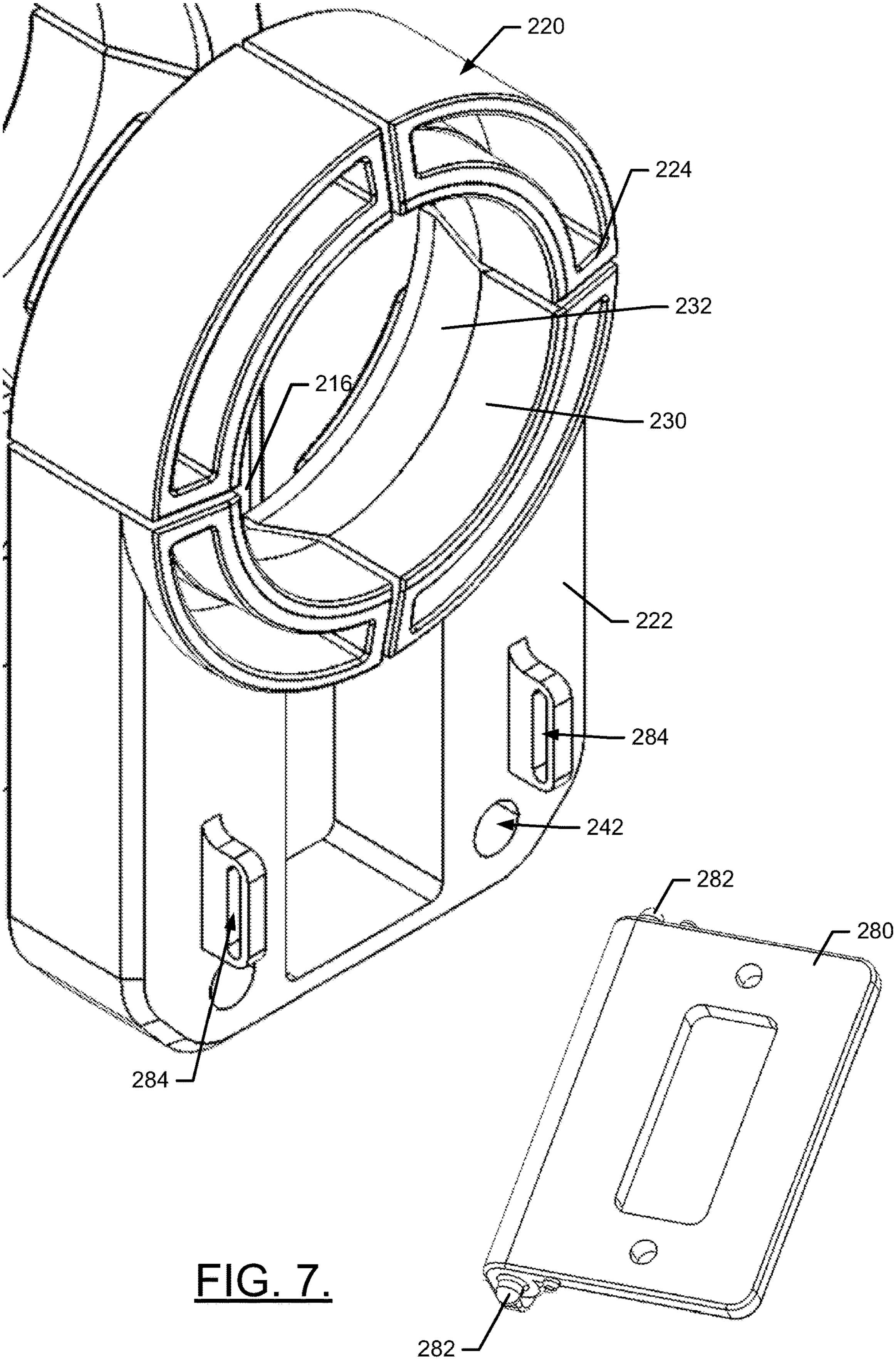
FIG. 7 is a perspective view of a strike plate locator in accordance with an example embodiment.
Figure 9:
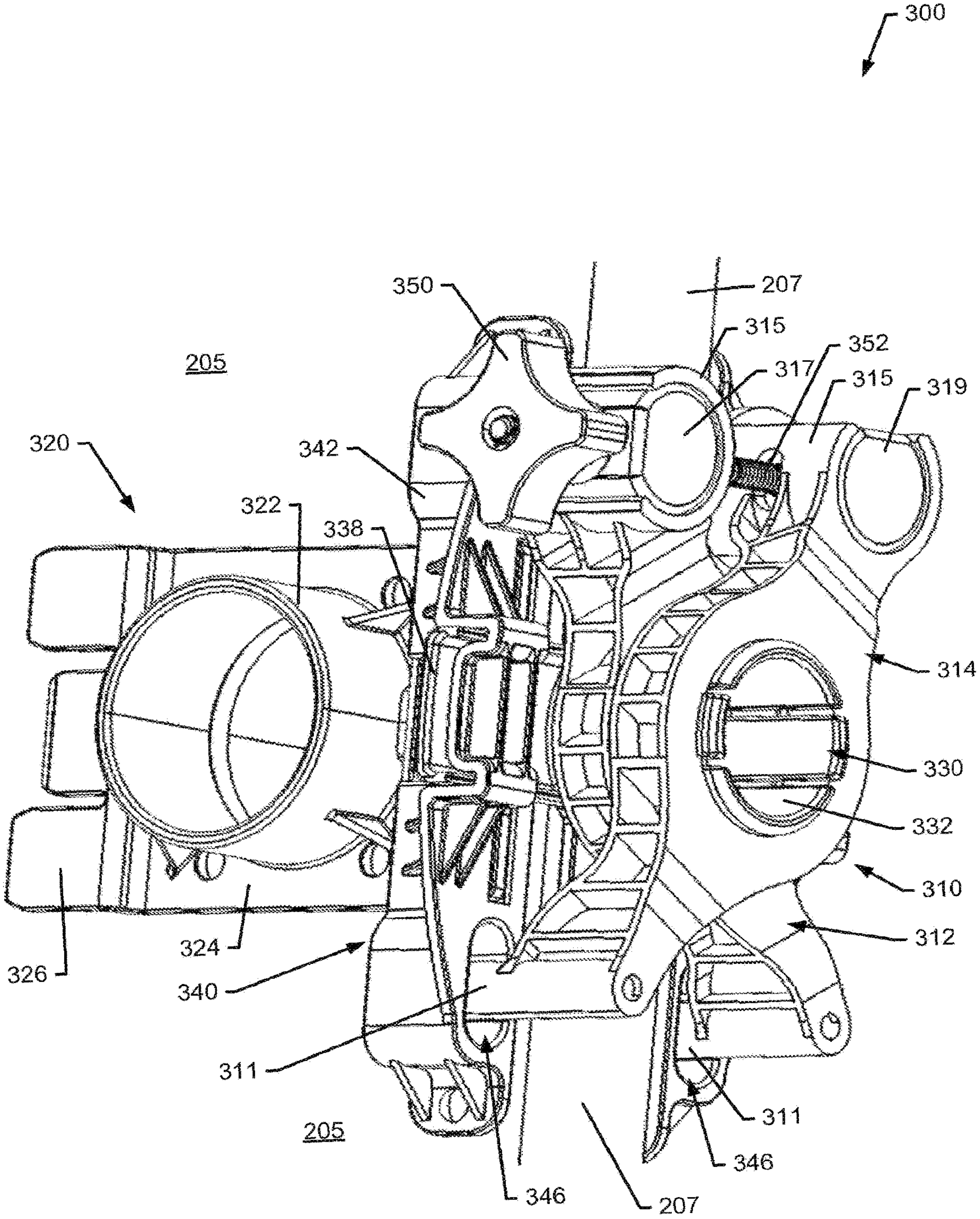
FIG. 9 is a perspective view of an alternative jig structure in accordance with an example embodiment.
Figure 10:
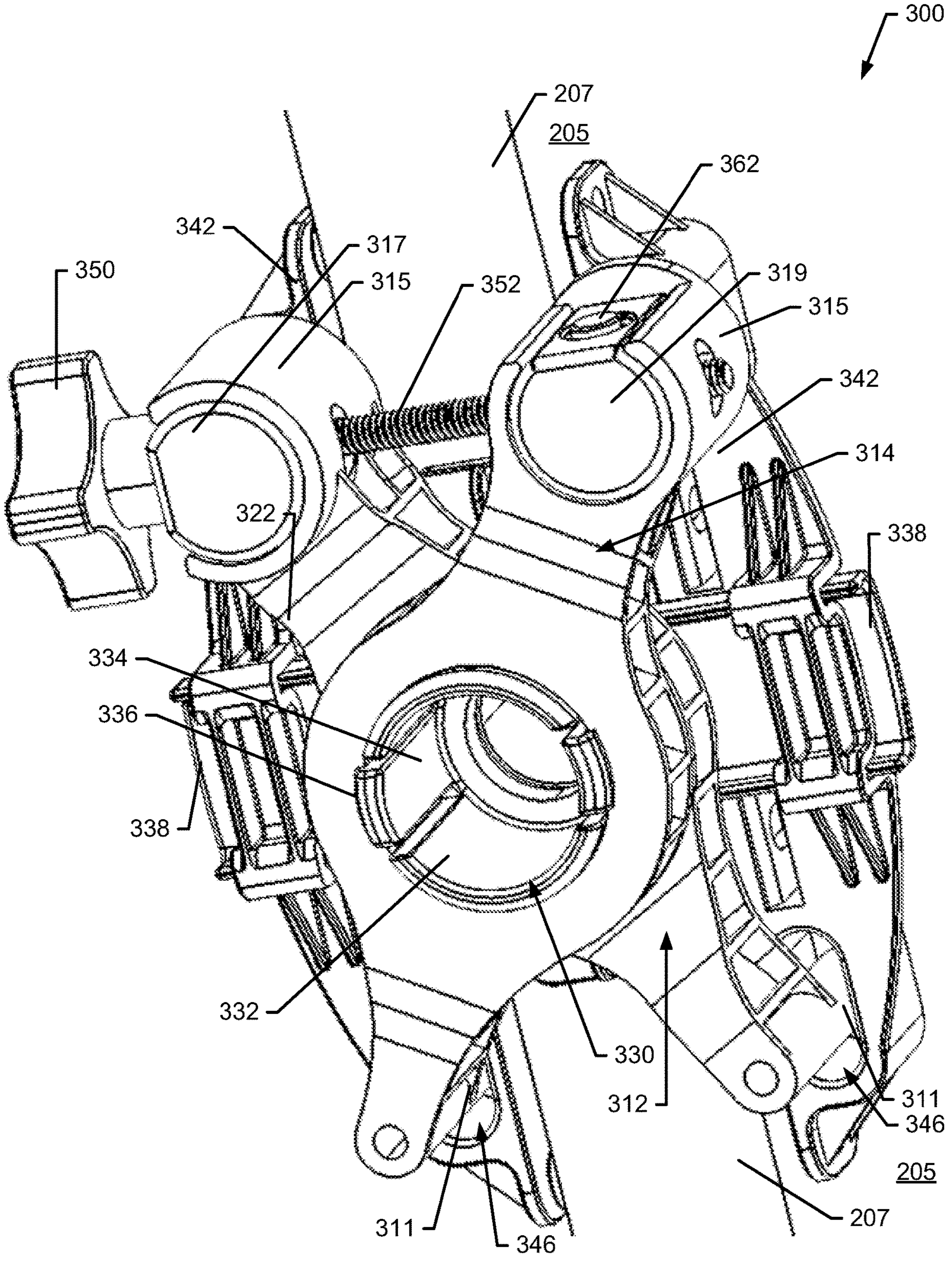
FIG. 10 shows another perspective view of the jig of FIG. 9 in accordance with an example embodiment.

FIGS. 2-8 will now be described to illustrate one example structure that may be used to instantiate example embodiments of the jig 100 of FIG. 1. In this regard, FIG. 2, which is defined by FIGS. 2A and 2B, shows two different perspective views of a jig 200 that is one example of the jig 100 of FIG. 1. FIG. 3 is a side view of the jig 200 attached to a door 205. FIG. 4 illustrates a perspective view of components that may form an example of the backset assembly 140 of FIG. 1. Meanwhile, FIG. 5 illustrates a perspective view of components that may instantiate the backset assembly 140 of FIG. 1 according to an example embodiment. FIG. 6 shows a structure for enabling a larger arbor than the diameter of the edge bore to be used. FIG. 7 shows structures for a hingedly attached strike plate locator. FIG. 8, which is defined by FIGS. 8A, 8B and 8C shows various views of a bore undercut in accordance with an example embodiment.

Referring now to FIGS. 2-8, the jig 200 may include a first leg 210 and a second leg 220. The first and second legs 210 and 220 may each include a base portion (i.e., base portions 212 and 222, respectively) and a bore collar (i.e., bore collars 214 and 224, respectively). The base portion 212 and the bore collar 214 of the first leg 210 may attach to each other and form an engaging face 216 that engages the door 205 when the jig 200 is attached to a first face of the door 205. Similarly, base portion 222 and the bore collar 224 of the second leg 220 may attach to each other and form an engaging face 226 that engages a second face (opposite the first face) of the door 205 when the jig 200 is attached to the door 205. The engaging faces 216 and 226 may extend substantially parallel to each other along opposite faces of the door 205.

In an example embodiment, the bore collars 214 and 224 may be substantially circular structures that form a passage or orifice through the first and second legs 210 and 220, respectively. The passage or orifice may extend in a direction that is substantially perpendicular to parallel planes in which respective ones of the first and second legs 210 and 220 lie. The bore collars 214 and 224 may each have a cylindrical portion 230 and an undercut portion 232, which are best shown in FIG. 8. The cylindrical portion 230 and undercut portion 232 of the first leg 210 may mirror the cylindrical portion 230 and undercut portion 232 of the second leg 220. In an example embodiment, the cylindrical portion 230 may have a consistent nominal diameter (D1) that is slightly larger than the diameter of the hole saw used to cut the handle bore in the door 205. Thus, for example, the nominal diameter (D1) may be about 2 and ⅛ inches in some embodiments. Meanwhile, the undercut portion 232 may extend from the nominal diameter (D1) to an undercut diameter (D2), which is larger than the nominal diameter (D1). In the examples of FIGS. 2-8, the undercut portion 232 defines a linear and relatively smooth transition from the nominal diameter (D1) to the undercut diameter (D2). However, the transition could be non-linear in other cases, and may include a prompt jump in some cases as well.

In an example embodiment, the first and second legs 210 and 220 may be operably coupled to each other by a web or spacing element 240. The spacing element 240 may be disposed between the first and second legs 210 and 212 at a portion of the base portions 212 and 222 that is opposite the bore collars 214 and 224 to provide a variable amount of spacing 5 between the first and second legs 210 and 220. In this regard, the base portions 212 and 222 may include threaded receivers 242 that are reverse threaded relative to each other. Threaded members 245 and 246 may pass through the threaded receivers 242, and at least one of the threaded members 245 and 246 may have an operator 248 disposed at an end thereof. The operator 248 may be rotated by a user of the jig 200 and reverse threading of the threaded members 245 and 246 and the receivers 242 may cause the first and second legs 210 and 220 to move farther apart (i.e., when rotated in one direction) or closer together (i.e., when rotated in the opposite direction). A distance between the spacing element 240 and each of the first and second legs 210 and 220 may be maintained to be substantially equal whether the distance is being increased or decreased.

As can be appreciated from FIGS. 2 and 3, the door 205 may be placed between the first and second legs 210 and 220. The jig 200 may then be aligned to the proper height on the door 205 at an edge 207 of the door 205 that is opposite the hinge assembly of the door 205. The engaging faces 216 and 226 of the first and second legs 210 and 220, respectively, may then be clamped against opposing faces of the door 205 by adjustment of the operator 248. Thus, the jig 200 could be used with doors 205 having different thicknesses (e.g., 1 and ⅜ inches or 1 and ¾ inches).

The spacing element 240 may have an inside face 250, which may be abutted against the edge 207 of the door 205 to define an amount of setback 251 from the edge 207. However, in some cases, in order to allow for different values for the setback 251, a setback adjuster 252 may be provided to be operably coupled to the spacing element 240 to define different amounts of the setback 251. The setback adjuster 252, and structures supporting the setback adjuster 252, may form one example of the backset assembly 140 of FIG. 1.

The setback adjuster 252 may be disposed between the inside face 250 and the edge 207 to define a variable distance (e.g., from zero to a predetermined value) between the inside face 250 and the edge 207. In an example embodiment, the spacing element 240 may have setback selector grooves 254 disposed along longitudinal ends of the spacing element 240. The setback selector grooves 254 may be provided in pairs or as a set of grooves. One set of setback selector grooves 254 may be disposed closer to the edge 207 of the door 205 (and therefore also closer to an inside face 250 of the spacing element 240). Meanwhile, the other set of setback selector grooves 254 may be disposed farther from the inside face 250 (and closer to an outside face 255) of the spacing element 240. The setback adjuster 252 may include a contactor 256, which is configured to contact the edge 207 at a variable distance from the inside face 250. In this example, the contactor 256 is substantially rectangular in shape (e.g., substantially matching a shape of a periphery of the inside face 250). However, the contactor 256 could alternatively have a different shape either generally, or relative to the inside face 250.

The setback adjuster 252 may also include a passage 255 formed through a center of the contactor 256. In other words, the contactor 256 may be hollow in a center thereof, and the hollow portion may form the passage 255. The passage 255 may allow the hole saw used for cutting the edge bore to pass therethrough (while also passing through a corresponding portion of the spacing element 240). The setback adjuster 252 may also include arms 258 that extend perpendicularly away from a plane in which the contactor 256 lies and toward the spacing element 240. The arms 258 may be disposed at opposing longitudinal ends of the contactor 256. Thus, the contactor 256 may have a rectangular shaped peripheral structure that bounds the passage 255 and that lies in a plate. The arms 258 may extend away from opposite longitudinal ends of the contactor 258 out of the plane.

An engagement tab 260 having engagement ridges 262 may be disposed at a distal end of each of the arms 258. The engagement tab 260 may be configured to releasably engage the setback selector grooves 254. In this regard, for example, the engagement ridges 262 may be configured to fit within the setback selector grooves 254. Accordingly, to adjust the amount of setback 251, the engagement tabs 260 may be lifted by the user to remove the engagement ridges 262 from engagement with the setback selector grooves 254. The arms 258 may then be slid (e.g., within slots 264 formed in opposing longitudinal ends of the spacing element 240) to increase or decrease the setback 251 (e.g., as shown by double arrow 266) to align the engagement ridges 262 with a different set of the setback selector grooves 254. The engagement ridges 262 may then settle into the setback selector grooves 254 with which alignment has been achieved to define a different amount of the setback 251. The contactor 256 can therefore be understood to move either closer to or further from the inside face 250 of the spacing element 240 to define the different amounts of setback 251 that are possible by increasing or decreasing the space between the inside face 250 and the edge 207 of the door 205. Of note, although the example of FIGS. 2-8 includes arms 258 that slide through the slots 264, the arms 258 could alternatively slide along the longitudinal ends of the spacing element 240 without including the slots 264. Moreover, it may also be possible to invert the locations of the setback selector grooves 254 and the engagement ridges 262 relative to the arms 258. In this regard, for example, the slots 264 may have a T shaped space formed in the spacing element 240, providing space within the T portion 269 of the T shape for placement of the setback selector grooves 254. The engagement tabs 260 may be operably coupled to engagement ridges 262 that face outwardly (instead of inwardly as described above) and engage the setback selector grooves 254 (that face inwardly) inside the T portion 269. In such an example, the engagement tabs 260 may be pressed inwardly toward each other to enable the increase or decrease of the setback 251.

In an example embodiment, the spacing element 240 may have a substantially rectangular prism shape, with the threaded members 245 and 246 passing through lateral sides of the spacing element 240 in a direction substantially perpendicular to the direction of extension of the slots 264. A edge bore collar 270 may be defined in the spacing element 240 to define a hole through the spacing element 240 through which the hole saw (e.g., a 1 inch hole saw) may cut the bolt/latch bore or edge bore. The edge bore collar 270 may therefore have a diameter (D3) that is slightly larger than the outside diameter of the hole saw that cuts the edge bore. However, many such hole saws have an arbor that may actually have a diameter larger than the hole saw (i.e., larger than one inch). To enable such hole saws to be used with the jig 200 without the arbor hitting and potentially damaging the edge bore collar 270, example embodiments may further include an arbor relief area 272 that extends around the edge bore collar 270 as a recessed portion extending inward from the outside face 244. In this example, the arbor relief area 272 has a larger diameter (D4) than the diameter (D3) of the edge bore collar 270, and extends uniformly at the larger diameter (D4) into the outside face 244 to a predetermined depth. However, other arrangements are also possible, including embodiments in which the diameter of the arbor relief area 272 is non-uniform over its depth.

Although not required, some embodiments may further include a hingedly attached strike plate locator 280. The strike plate locator 280 may have a template area that illustrates locations for screw holes and a latch/bolt slot for a strike plate. The strike plate locator 280 may be hingedly or rotatably attached to one of the legs (e.g., the second leg 220), on an outside surface thereof. The strike plate locator 280 may be attached via an axial rod or protrusions 282 that is pivotable, and also configured to be capable of sliding along retention slots 284 formed on the outside surface of the second leg. The retention slots 284 may be spaced apart from each other by a width of the strike locator plate 280, and may have a length that is at least equal to a distance between the setback selector grooves 254. Thus, when the contactor 256 is moved to change the amount of setback 251, the strike plate locator 280 may also be moved along the retention slots 284 (by sliding the protrusions 282 in the retention slots 284) to make the strike locator plate 280 lie in a same plane as the contactor 256 regardless of where the contactor 256 is positioned. That said, other possible locations for arrangement of the strike locator plate 280 are also possible.

Other structures can also be used to implement the design of FIG. 1. In this regard, for example, FIGS. 9-16 show various structures and components of a jig 300 that provides another example of the jig 100 of FIG. 1. The jig 300 includes an engagement interface 310 that enables the jig 300 to be temporarily attached to the edge of a door. The engagement interface 310 of an example embodiment may be adjustable to enable the jig 300 to be used with doors that have different thicknesses (defined between the inside and outside faces of the door). The engagement interface 310 may include a first arm 312 and a second arm 413. In this example, the first and second arms 312 and 314 are each the same length, and are operably coupled to each other such that they are adjacent to each other, and pivot about a common pivot point that is integrated into an edge bore guide 330 (which is an example of the edge bore guide structure 130 of FIG. 1) for boring the edge bore into the edge 207 of the door 205. However, it should be appreciated that the first and second arms 312 and 314 could have different lengths in alternative embodiments.

Each of the first and second arms 312 and 314 of this embodiment includes a first protrusion 311 at a first end thereof, an edge bore guide receiver 313 approximately at a center thereof, and a pivotal link receiver 315 at a second end thereof (opposite the first end). Each pivotal link receiver 315 may have a corresponding second protrusion 316 coaxial therewith, and the second protrusion 316 may extend in a direction substantially parallel to the direction of extension of the first protrusion 311. The first and second protrusions 311 and 316 may also extend substantially perpendicular to a longitudinal centerline of a respective one of the first and second arms 312 and 314. Meanwhile, each of the pivotal link receivers 315 may be hollowed out along an axis that is substantially parallel to the direction of extension of the first and second protrusions 311 and 316. A first pivotal link 317 may be rotatably disposed on one of the pivotal link receivers 315, and a second pivotal link 319 may be rotatably disposed in the other of the pivotal link receivers 315. Accordingly, the first and second arms 312 and 314 may effectively form an X-shape, and the angles between the arms may be adjusted to change the width of the engagement interface 310 to accommodate doors having different widths.

The edge bore guide 330 may include bore collar 332 that defines a hollow cylinder about which the edge bore guide receiver 313 of each of the first and second arms 312 and 314 may be rotatably mounted. In an example embodiment, the bore collar 332 may include flexible fingers 334 that have locking tabs 336 disposed at distal ends thereof. The first and second arms 312 and 314 may each be mounted to the edge bore guide 330 by sliding the edge bore guide receiver 313 over the bore collar 332. The locking tabs 336 may initially be depressed toward each other as the flexible fingers 334 also flex toward each other. Then, after the first and second arms 312 and 314 have been mounted onto the bore collar 332, the flexible fingers 334 and locking tabs 336 may move apart from each other and the locking tabs 336 may retain the edge bore guide receiver 313 of each of the first and second arms 312 and 314 on the bore collar 332.

The edge bore guide 330 of this example also includes guide rails 338 that extend away from each other on opposite lateral sides of the bore collar 332. The guide rails 338 of this example each have a C-shaped cross section to provide support and rigidity. However, alternative shapes are possible. The bore collar 332 provides a guide for the insertion of a boring tool therein to cut the edge bore into the edge 207 of the door 205. Moreover, as will be discussed in greater detail below, the engagement interface 310 is structured to provide self or automatic centering of the bore collar 332 on the edge 207 of the door 205. In other words, no matter how thick the door 205 is between inside and outside faces thereof, the engagement interface 310 will, when being tightened onto the door 205, automatically center the bore collar 332 on the edge 207.

The jig 300 also includes a handle hole guide 320 (which is an example of the handle hole guide structure 120 of FIG. 1). The handle hole guide 320 includes a handle hole collar

322 that extends substantially perpendicularly away from a guide body 324. The guide body 324 may be a planar support member, and the handle hole collar 332 may define a hollow cylinder to guide a boring tool therein to cut the handle hole through the door 205 backset away from the edge 207. The guide body 324 may have a set of one or more engagement structures (e.g., engagement members 326) disposed at each opposing longitudinal end thereof. The engagement members 326 on one longitudinal end may extend away from the guide body 324 in a direction opposite the direction of extension of the engagement members 326 at the other longitudinal end of the guide body 324. The engagement members 326 of this example are flat fingers that extend substantially parallel to the plane in which the guide body 324 lies. However, other structures and orientations could be employed in some alternatives. Moreover, although the set of engagement structures shown includes three engagement members 326, as few as one such engagement member 326, or potentially many more could be employed in alternative embodiments.

The jig 300 may also include a backset assembly 340 that cooperates with the handle hole guide 320 to enable different backsets (e.g., 2 and ⅜ inches or 2 and ¾ inches) to be supportable with only minor operator action. The backset assembly 340 of some embodiments may be operably coupled to the engagement interface 310. Moreover, in some embodiments, the backset assembly 340 may be operably coupled to the engagement interface 310 via the edge bore guide 330. In this regard, for example, the first and second arms 312 and 314 of the engagement interface 310 may be pivotally or rotationally mounted onto the edge bore guide 330 via the bore collar 332. The edge bore guide 330 may then be operably coupled to mounting brackets 342 of the backset assembly 340 via the guide rails 338. As such, for example, the mounting brackets 342 (which may be identically structured, but oriented to mirror each other about the door 205 on the inside and outside faces of the door 205), may each include a guide rail receiver 344 that is shaped to slidably engage or receive the guide rails 338. Thus, the guide rail receiver 344 may be a C-shaped channel that fits the guide rail 338 relatively snugly, albeit still slidably, therein. The mounting brackets 342 may also include adjustment slots 346 disposed at opposite ends thereof. The adjustment slots 346 may extend substantially parallel to a longitudinal centerline of the mounting brackets 342, and may receive the first and second protrusions 311 and 316, respectively of the first and second arms 312 and 314. Thus, for example, the first protrusion 311 of the first arm 312 and the second protrusion 316 of the second arm 314 may ride in the adjustment slots 346 of one of the mounting brackets 342. Meanwhile, the first protrusion 311 of the second arm 314 and the second protrusion 316 of the first arm 312 may ride in the adjustment slots 346 of the other one of the mounting brackets 342.

Each of the mounting brackets 342 may also include handle hole guide receivers 348 that engage the engagement members 326 as described in greater detail below. The mounting brackets 342 may also include rubber feet, or other flexible interface members, that may be positioned to interface with the door 205 when the mounting brackets 342 are tightened onto the door 205. The feet may facilitate maintaining contact with the door 205, and fixing the mounting brackets 342 onto the door 205.

An adjuster formed from an adjusting knob 350 and a threaded rod 352 may be configured to interface with the first and second pivotal links 317 and 319. The threaded rod 352 may also selectively engage quick adjust assembly 360, which may include a button 362 that operates the quick adjust assembly 360. In an example embodiment, the quick adjust assembly 360 may be disposed inside the second pivotal link 319 and may include a partially threaded portion 364 that is operably coupled to the button 362. A spring 366 (shown in dotted lines since it is not actually visible in this view) inside the quick adjust assembly 360 may bias the button 362 upward in a direction shown by arrow 368. Such biasing may tend to force the partially threaded portion 364 into contact with the threaded rod 352. When such contact exists, the adjusting knob 350 may be rotated to turn the threaded rod 352. The threaded rod 352 may be in threaded engagement with the partially threaded portion 364 of the quick adjust assembly 360.

In some cases, the spring 366 may have a biasing force that allows advancement of the threaded rod 352 via rotation when the button 362 is not pressed. Meanwhile, when the button 362 is pressed, the threaded portion 364 may be out of engagement with the threaded rod 352 enabling easy repositioning of the first and second arms 312 and 314 relative to each other. In some cases, the force of the spring 366 may be overcome to allow the threaded rod 352 to be forced through the quick adjust assembly 360 without rotation when pushed with sufficient force. Other methods for operation of the quick adjust assembly 360 are also possible.

Turning the adjusting knob 350 in a first direction (e.g., clockwise) may tighten the engagement interface 310. In this regard, turning the adjusting knob 350 in the first direction may draw the second pivotal link 319 farther inward along the threaded rod 352 thereby drawing the second pivotal link 319 closer to the first pivotal link 317 (as shown by arrows 370). The first and second pivotal links 319 may each rotate within the pivotal link receivers 315, and the first and second protrusions 311 and 316 may slide in the adjustment slots 346 of the mounting brackets 342, but draw the mounting brackets 342 closer together (in the direction of arrows 370). Turning the adjusting knob 350 in a second direction (e.g., counterclockwise) may do the opposite. For example, turning the adjusting knob 350 in the second direction may push the second pivotal link 319 farther outward along the threaded rod 352 thereby pushing the second pivotal link 319 away from the first pivotal link 317 (in a direction opposite the direction of arrows 370). The first and second pivotal links 319 may each rotate within the pivotal link receivers 315, and the first and second protrusions 311 and 316 may slide in the adjustment slots 346 of the mounting brackets 342, but push the mounting brackets 342 farther apart (in directions opposite those of arrows 370).

Figure 11:
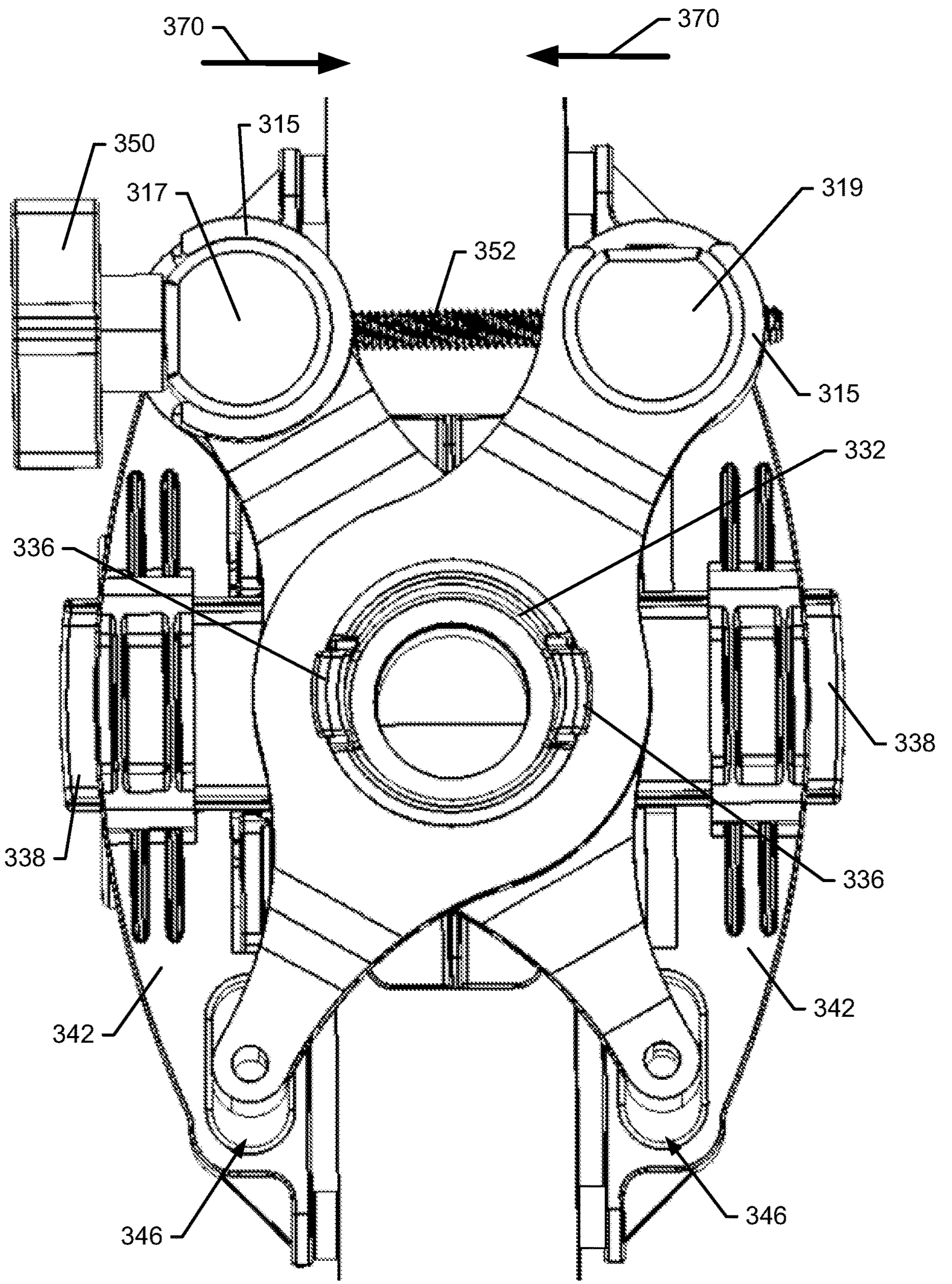
FIG. 11 shows a front view of the jig aligned with an axis of the edge bore guide structure in accordance with an example embodiment.
Figure 12:
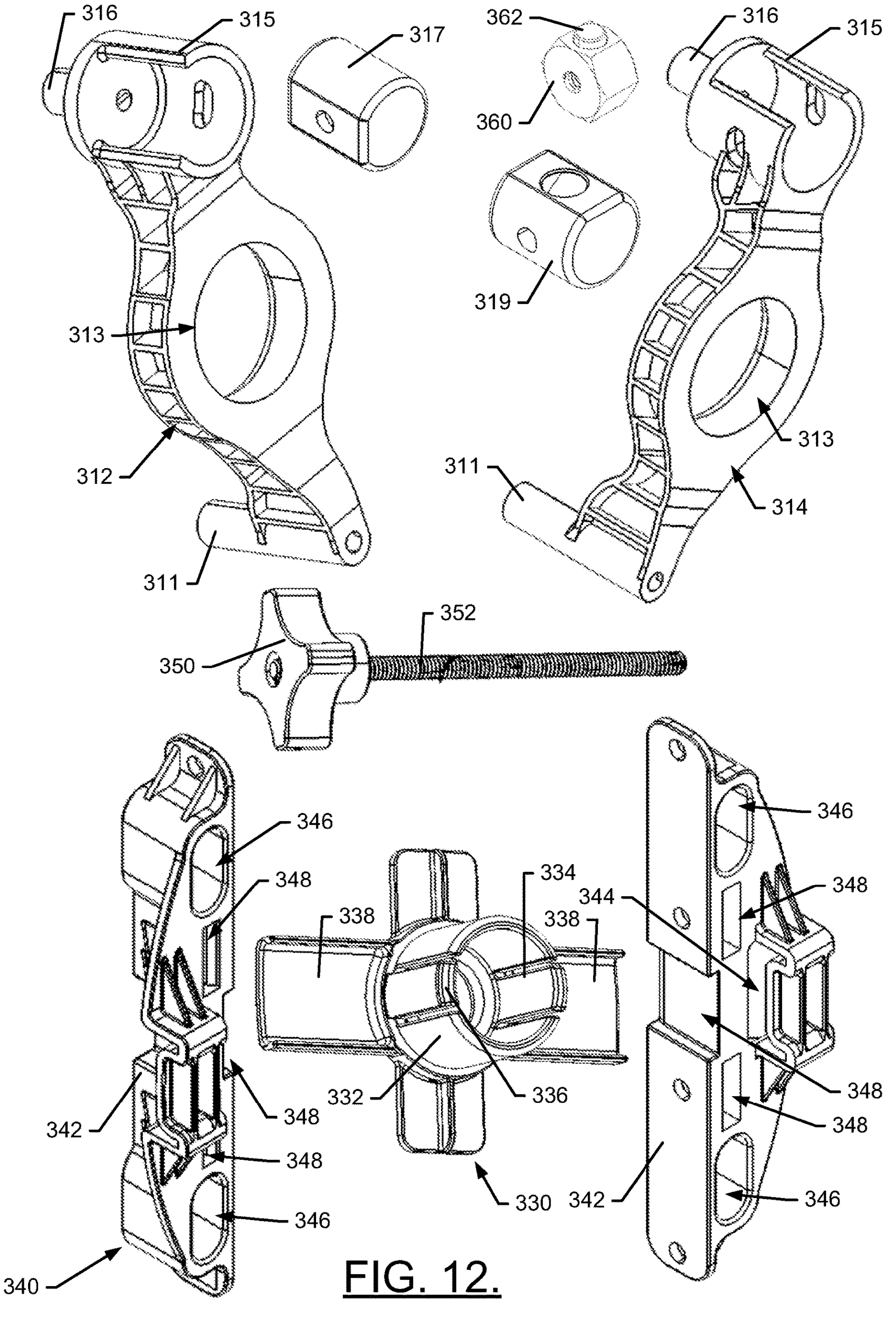
FIG. 12 illustrates an exploded view of various components of the jig of FIG. 9 in accordance with an example embodiment.
Figure 13A:
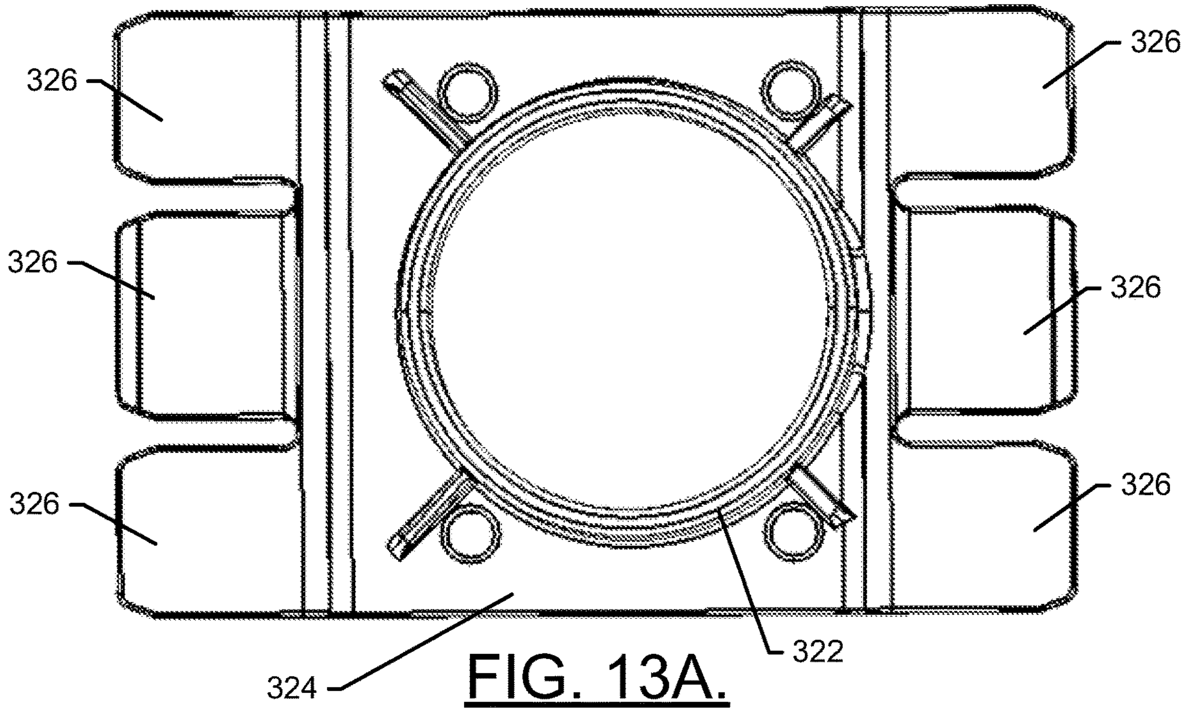
FIG. 13A shows a side view of a handle hole guide.
Figure 13B:
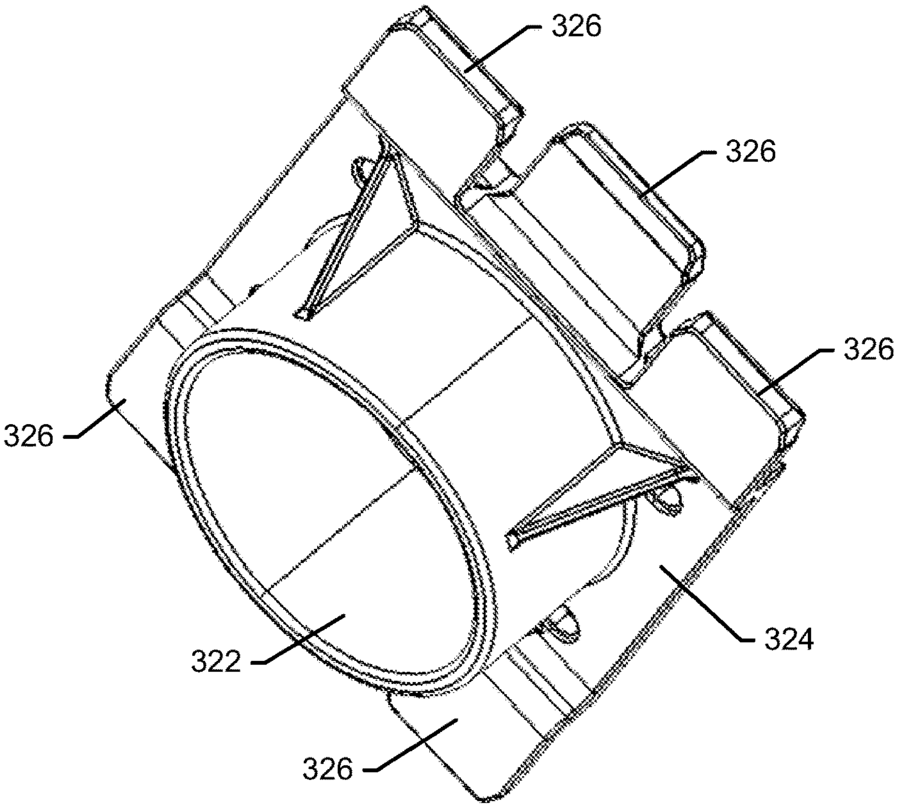
FIG. 13B shows a perspective view of the handle hole guide in accordance with an example embodiment.
Figure 14:
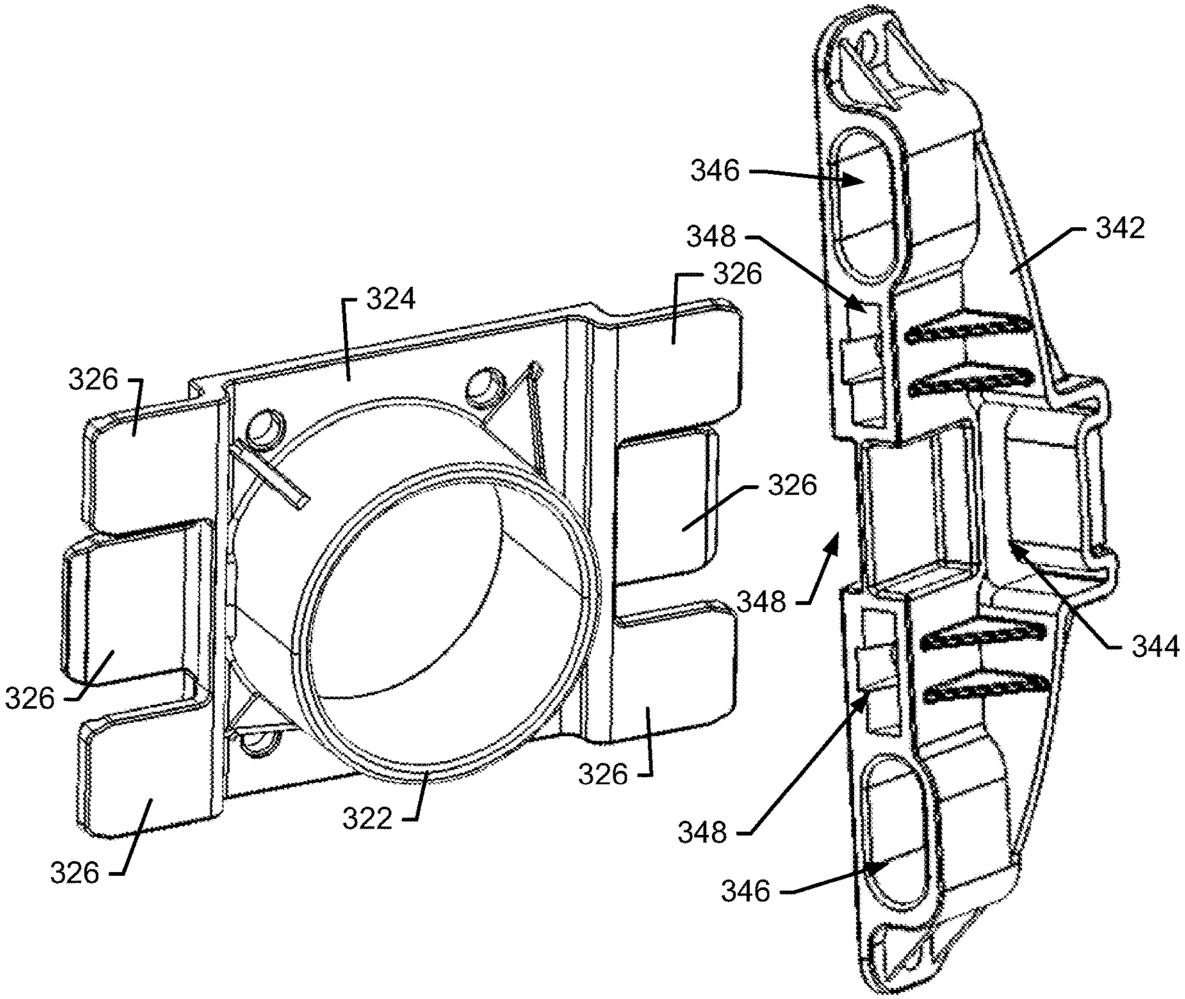
FIG. 14 shows a perspective view of the handle hole guide engaging a portion of the backset assembly in accordance with an example embodiment.
Figure 16:
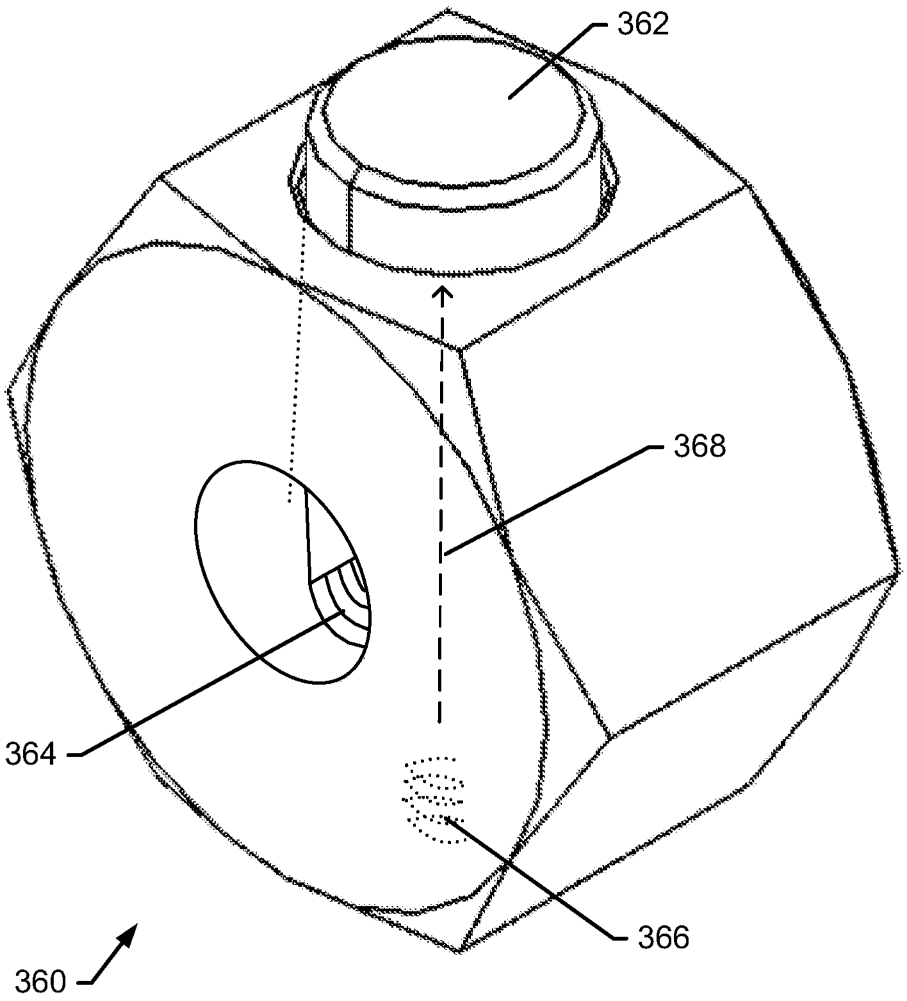
FIG. 16 shows one example structure for providing easy adjustment of the engagement interface in accordance with an example embodiment.

In each case, whether tightening or loosening the jig 300, the first and second arms 312 and 314 of this example will pivot relative to one another about the bore collar 332. In this example where the first and second arms 312 and 314 are the same length, the threaded rod 352 tends to stay parallel to the ground (or perpendicular to the plane of the edge 207 or inside and outside faces of the door 205) as shown in FIG. 11. The bore collar 332 will remain centered between the mounting brackets 342 in all cases. Thus, the engagement interface 310 effectively provides infinite adjustment capability to any desirable door width that is below a maximum width that the jig 300 can accommodate. Meanwhile, the backset assembly 340 of this example does not provide infinite adjustment capability, but instead allows selection of backsets between two standard options. However, the selection between such options can be made after the jig 300 is otherwise tightened onto the door 205.

In this regard, the engagement members 326 may be configured to removably engage the handle hole guide receivers 348 formed in the mounting brackets 342 before or after the mounting brackets 342 have been tightened onto the door 205. In this example, the engagement members 326 may slide into the handle hole guide receivers 348 in a direction parallel to the surface of the door 205. However, other methods of engagement could be used in alternative embodiments. For example, the engagement members 326 may plug into the handle hole guide receivers 348 in a direction perpendicular to the surface of the door 205, or may be engaged and pivoted into position adjacent to the door 205. Regardless of the specific engagement means employed, the result may be that the handle hole guide 320 is retained adjacent to the surface of the door 205 on either the inside face or outside face. Moreover, the operator may drill or cut a hole using the handle hole collar 322 as a guide on one side of the door 205, and then easily move the handle hole guide 320 to the other side of the door 205 and drill or cut from the opposite side (choosing the same backset distance) to complete the handle hole.

Given that the engagement members 326 on each opposite longitudinal end of the guide body 324 are identical, either opposing longitudinal end of the handle hole guide 320 could be engaged with the mounting brackets 342 (e.g., by insertion of the corresponding engagement members 326 into the handle hole guide receiver 348 of the corresponding mounting bracket 342). In an example embodiment, the handle hole collar 322 may not be centered on the guide body 324, but may instead be positioned on the guide body 324 such that engaging one set of the engagement members 326 with the handle hole guide receiver 348 of the mounting bracket 342 achieves a first setback distance (D1) shown in FIG. 15A. However, if the handle hole guide 320 is rotated 180 about an axis of the handle hole collar 322 and the corresponding other set of the engagement members 326 are engaged with the handle hole guide receiver 348 of the mounting bracket 342, then a larger second setback distance (D2) shown in FIG. 15B may be achieved.

Figure 17:
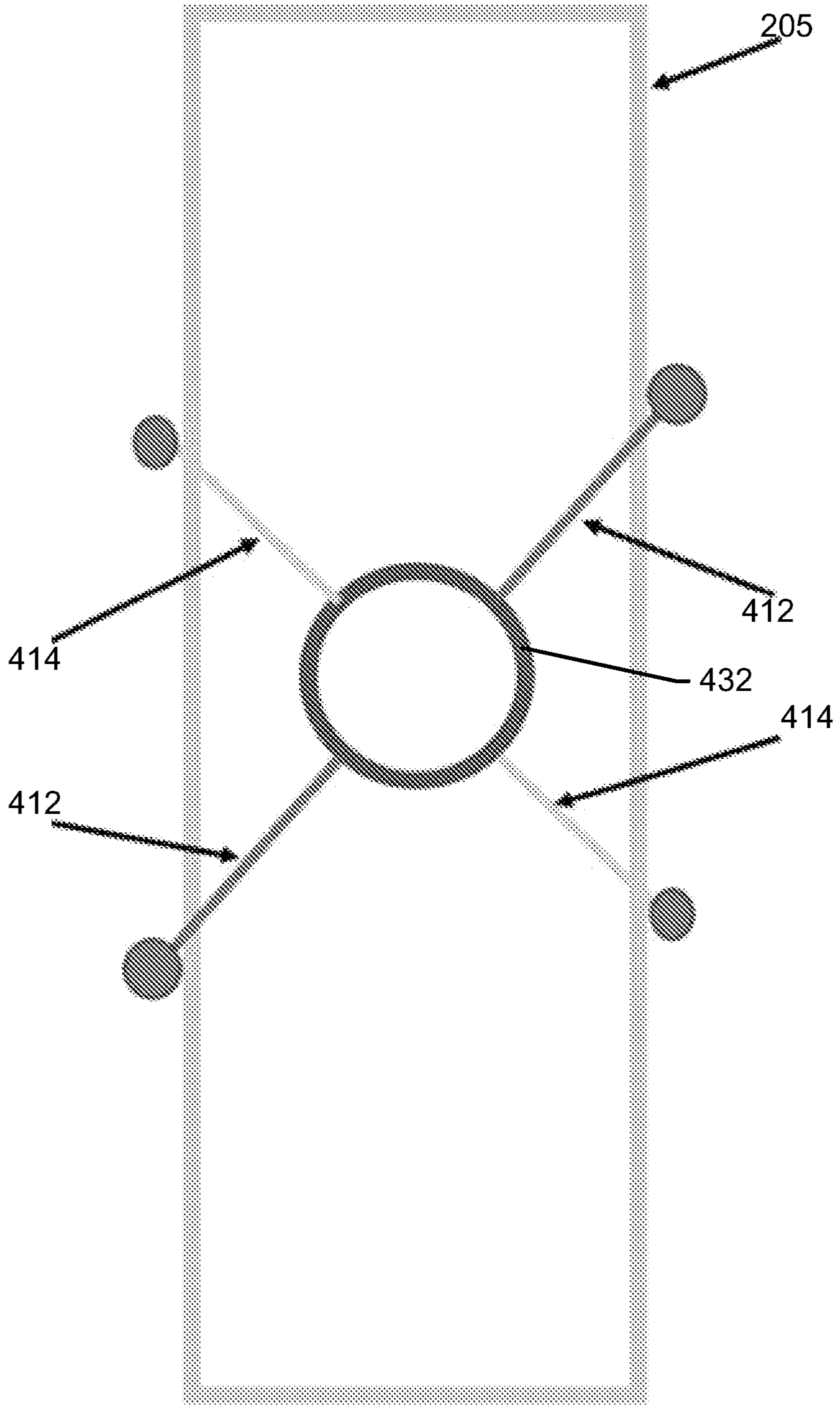
FIG. 17 shows an alternative jig with arms of different lengths in accordance with an example embodiment.
Figure 18:
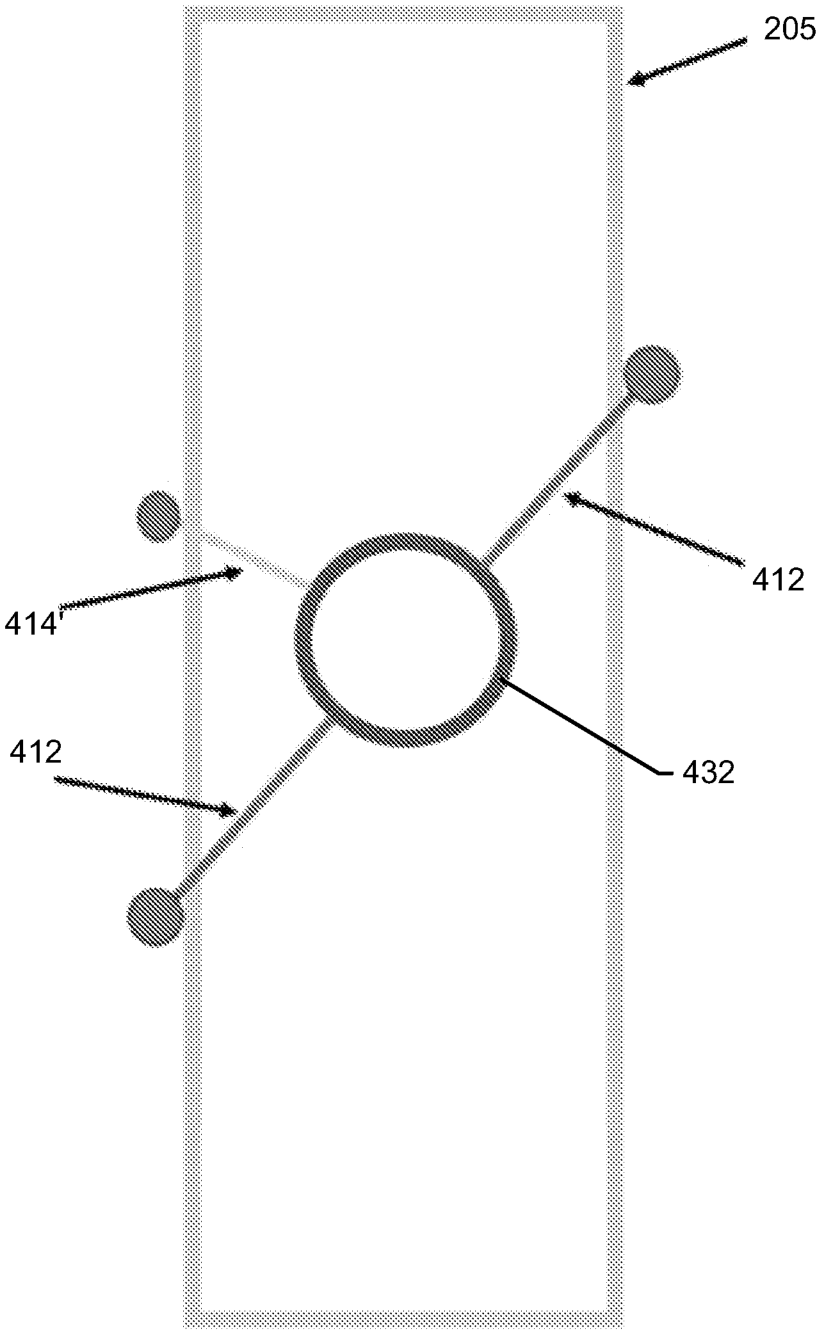
FIG. 18 shows still another alternative jig with an edge bore collar disposed at the end of one of the arms in accordance with an example embodiment.

Instead of having the first and second arms 312 and 314 have the same length, it may be possible to shorten the length of the second arm 314. FIG. 17 illustrates a schematic view of an alternate structure in which jig 400 includes a first arm 412 that is longer than second arm 414. Edge bore collar 432 remains centered on the door 205, but the threaded rod 452 is no longer parallel to the ground. In the example of FIG. 17, the edge bore collar 432 remains located at a center of the second arm 414. However, the edge bore collar 432 could 5 alternatively be at an end of the second arm 414' as shown in the alternative structure of FIG. 18. In the example of FIG. 18, only the first arm 412 would engage both mounting brackets. Slots in the mounting brackets, and other structures of the jig 400 may otherwise be similar to the example shown above. The second arm 414' may have one end that terminates at the threaded rod 452 (e.g., via a pivot link as described above). The other end of the second arm 414' may terminate at the edge bore collar 432 and be rotatably mounted thereto. In this example, the distance from the axis of rotation of both the first and second arms 412 and 414' to the point of intersection with the threaded rod 452 may be different. However, it may also be possible to length the second arm 414' so the distances are the same. If the distances are the same, the threaded rod 452 will extend perpendicular to the planes of the inside and outside faces of the door. If the distances are different, the threaded rod 452 will be at an angle that is not normal to the inside and outside faces of the door.

Example embodiments utilize the pivoting arms described above to enable automatic centering of the edge bore (or latch bore) for any thickness of door. Moreover, such automatic centering is performed without any special assembly, adjustment or other changes. Example embodiments also employ a quick release functionality that can enable easy removal of the jig after use. The jig of example embodiments can also be quickly adjusted and tightened during installation, or for storage of the jig.

In an example embodiment, a cutting guide apparatus (or device) for guiding placement of bore holes in a door may be provided. The apparatus may include an engagement interface and a backset assembly. The engagement interface may be configured to retain the apparatus proximate to an edge of a door and center an edge bore guide between an inside face and an outside face of the door. The engagement interface includes a first arm and a second arm that are each operably coupled to a common pivot axis. The backset assembly is operably coupled to the engagement interface to enable an amount of backset from the edge of the door to a center of a handle hole guide to be adjusted. The backset assembly includes a first mounting bracket operably coupled to a first portion of the first arm and a first portion of the second arm. The first mounting bracket may be disposed along one of the inside face or the outside face. The backset assembly may include a second mounting bracket operably coupled to a second portion of the first arm, the second mounting bracket being disposed along the other of the outside face or the inside face.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the edge bore guide may include an edge bore collar that defines the common pivot axis. The edge bore collar may define a guide for a boring tool to cut or bore a hole in the edge of the door. In an example embodiment, a midpoint of each of the first arm and the second arm is operably coupled to the edge bore collar. In some cases, the first and second arms may have an equal length. In an example embodiment, a midpoint of the first arm and a second end of the second arm may be operably coupled to the edge bore collar. In some cases, the amount of backset may be adjusted by changing a distance of a center of a handle hole collar in the handle hole guide from the edge of the door. In an example embodiment, the distance of the center of the handle hole collar may be adjusted by rotating the handle hole guide 180 degrees prior to operably coupling the handle hole guide to the first mounting bracket or the second mounting bracket. In some cases, the handle hole guide may include a guide body having engagement members disposed on opposite ends thereof. The engagement members may operably couple to handle hole guide receivers formed in the first and second mounting brackets. In an example embodiment, the first portion of the first arm may include a first pivotal link receiver configured to rotatably retain a first pivotal link. The first portion of the second arm may include a second pivotal link receiver configured to rotatably retain a second pivotal link. A threaded rod may be operably coupled to each of the first and second pivotal links to draw the first and second pivotal links toward each other responsive to rotation of the threaded rod in a first direction and urge the first and second pivotal links apart responsive to rotation of the threaded rod in a second direction. In some cases, the second pivotal link may include a quick adjust assembly that is biased to engage the threaded rod. Overcoming the bias of the quick adjust assembly may enable the threaded rod to move through the second pivotal link without rotation. In an example embodiment, the threaded rod may extend substantially perpendicular to a plane of each of the inside face and the outside face. In some embodiments, the threaded rod may extend at an angle that is not perpendicular to a plane of each of the inside face and the outside face.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A cutting guide apparatus for guiding placement of bore holes in a door, the apparatus comprising:

an engagement interface configured to retain the apparatus proximate to an edge of a door and center an edge bore guide between an inside face and an outside face of the door, the engagement interface comprising a first arm and a second arm that are each operably coupled to a common pivot axis; and a backset assembly that is operably coupled to the engagement interface to enable an amount of backset from the edge of the door to a center of a handle hole guide to be adjusted, wherein the backset assembly comprises a first mounting bracket operably coupled to a first portion of the first arm and a first portion of the second arm, the first mounting bracket being disposed along one of the inside face or the outside face, wherein the backset assembly comprises a second mounting bracket operably coupled to a second portion of the first arm, the second mounting bracket being disposed along the other of the outside face or the inside face, wherein the edge bore guide comprises an edge bore collar that defines the common pivot axis, the edge bore collar defining a guide for a boring tool to cut or bore a hole in the edge of the door, and wherein a midpoint of the first arm and a second end of the second arm are operably coupled to the edge bore collar.

2. The apparatus of claim 1, wherein a midpoint of each of the first arm and the second arm is operably coupled to the edge bore collar.

3. The apparatus of claim 2, wherein the first and second arms have an equal length.

4. The apparatus of claim 1, wherein the amount of backset is adjusted by changing a distance of a center of a handle hole collar in the handle hole guide from the edge of the door.

5. The apparatus of claim 4, wherein the distance of the center of the handle hole collar is adjusted by rotating the handle hole guide 180 degrees prior to operably coupling the handle hole guide to the first mounting bracket or the second mounting bracket.

6. The apparatus of claim 5, wherein the handle hole guide comprises a guide body having engagement members disposed on opposite ends thereof, wherein the engagement members operably couple to handle hole guide receivers formed in the first and second mounting brackets.

7. A cutting guide apparatus for guiding placement of bore holes in a door, the apparatus comprising:

an engagement interface configured to retain the apparatus proximate to an edge of a door and center an edge bore guide between an inside face and an outside face of the door, the engagement interface comprising a first arm and a second arm that are each operably coupled to a common pivot axis; and a backset assembly that is operably coupled to the engagement interface to enable an amount of backset from the edge of the door to a center of a handle hole guide to be adjusted, wherein the backset assembly comprises a first mounting bracket operably coupled to a first portion of the first arm and a first portion of the second arm, the first mounting bracket being disposed along one of the inside face or the outside face, wherein the backset assembly comprises a second mounting bracket operably coupled to a second portion of the first arm, the second mounting bracket being disposed along the other of the outside face or the inside face, wherein the edge bore guide comprises an edge bore collar that defines the common pivot axis, the edge bore collar defining a guide for a boring tool to cut or bore a hole in the edge of the door, wherein the first portion of the first arm comprises a first pivotal link receiver configured to rotatably retain a first pivotal link, wherein the first portion of the second arm comprises a second pivotal link receiver configured to rotatably retain a second pivotal link, and wherein a threaded rod is operably coupled to each of the first and second pivotal links to draw the first and second pivotal links toward each other responsive to rotation of the threaded rod in a first direction and urge the first and second pivotal links apart responsive to rotation of the threaded rod in a second direction.

8. The apparatus of claim 7, wherein a midpoint of the first arm and a second end of the second arm are operably coupled to the edge bore collar.

9. The apparatus of claim 7, wherein the second pivotal link comprises a quick adjust assembly, the quick adjust assembly biased to engage the threaded rod, and wherein overcoming the bias of the quick adjust assembly enables the threaded rod to move through the second pivotal link without rotation.

10. The apparatus of claim 7, wherein the threaded rod extends substantially perpendicular to a plane of each of the inside face and the outside face.

11. The apparatus of claim 7, wherein the threaded rod extends at an angle that is not perpendicular to a plane of each of the inside face and the outside face.

* * * * *